US012692713B1

(12) United States Patent
Morgan

(10) Patent No.: US 12,692,713 B1
(45) Date of Patent: Jul. 28, 2026

(54) STRUCTURAL UNITS AND METHODS OF MODULAR MANUFACTURING OF STRUCTURAL UNITS

(71) Applicant: Ascension Automation Solutions Ltd., Cambridge (CA)

(72) Inventor: Andrew Morgan, Guelph (CA)

(73) Assignee: Ascension Automation Solutions Ltd., Cambridge (CA)

( * ) Notice: Subject to any disclaimer, the term of this patent is extended or adjusted under 35 U.S.C. 154(b) by 0 days.

(21) Appl. No.: 19/267,413

(22) Filed: Jul. 11, 2025

(51) Int. Cl.
*E04G 21/16* (2006.01)
*B25J 9/16* (2006.01)

(52) U.S. Cl.
CPC ............ *E04G 21/161* (2013.01); *B25J 9/162* (2013.01); *B25J 9/1687* (2013.01); *B25J 9/1697* (2013.01)

(58) Field of Classification Search
CPC ....... E04G 21/14; E04G 21/16; E04G 21/161; E04G 21/167; E04G 21/18; E04G 21/1841; E04H 1/005; E04B 1/348; E04B 1/34807; E04B 1/34815; E04B 1/34861; E04B 1/34384; E04B 1/35; E04B 2001/3588
See application file for complete search history.

(56) References Cited

U.S. PATENT DOCUMENTS

| | | | | | |
|---|---|---|---|---|---|
| 1,362,069 | A | * | 12/1920 | Witzel | ................ E04B 1/34815 |
| | | | | | 52/745.03 |
| 2,305,906 | A | * | 12/1942 | Smith | ................... E04G 21/168 |
| | | | | | 269/58 |
| 2,499,498 | A | * | 3/1950 | Hammond, Jr. | ........ E04H 1/005 |
| | | | | | 414/277 |
| 3,118,187 | A | * | 1/1964 | Alimanestiano | ........ B60R 15/00 |
| | | | | | D25/4 |
| 3,494,091 | A | * | 2/1970 | Turturro, Jr. | .......... E04G 21/161 |
| | | | | | 52/745.02 |
| 3,537,597 | A | * | 11/1970 | Barns | ...................... E04G 21/14 |
| | | | | | 212/75 |
| 3,679,177 | A | * | 7/1972 | Scholz | .................... E04G 21/16 |
| | | | | | 52/749.1 |
| 3,842,988 | A | * | 10/1974 | Russell | ................... E04G 21/16 |
| | | | | | 414/754 |

(Continued)

FOREIGN PATENT DOCUMENTS

| | | | | | |
|---|---|---|---|---|---|
| CN | 105781113 | A | * | 7/2016 | ............. E04G 21/04 |
| CN | 107139156 | A | * | 9/2017 | .............. B25J 5/007 |

(Continued)

OTHER PUBLICATIONS

Enaam Ouda et al Automation in Modular Construction Manufacturing: A Comparative Analysis of Assembly Processes Sustainability 2024, 16, 9238.

*Primary Examiner* — Ryan D Kwiecinski
(74) *Attorney, Agent, or Firm* — CALDWELL LLC

(57) ABSTRACT

A method for modular manufacturing of a structural unit, the method including affixing a plurality of structural components to an automated assembly system, wherein the plurality of structural components includes at least one roof and at least one wall, orienting the plurality of structural components using the automated assembly system, securing each of the plurality of structural components together using one or more precision locking mechanisms, forming a structural unit with the plurality of structural components and removing the automated assembly system from the structural unit.

10 Claims, 7 Drawing Sheets

(56)          References Cited

U.S. PATENT DOCUMENTS

| | | | | | |
|---|---|---|---|---|---|
| 3,921,362 | A | * | 11/1975 | Ortega | E04G 21/167 |
| | | | | | 52/745.14 |
| 4,481,743 | A | * | 11/1984 | Jellen | E02D 27/00 |
| | | | | | 52/745.11 |
| 4,969,789 | A | * | 11/1990 | Searle | E04G 21/22 |
| | | | | | 294/81.61 |
| 4,976,086 | A | * | 12/1990 | Bom | E04G 21/14 |
| | | | | | 52/749.1 |
| 5,073,077 | A | * | 12/1991 | Altman | B66F 9/147 |
| | | | | | 414/722 |
| 5,261,542 | A | * | 11/1993 | Robbie | E02F 3/303 |
| | | | | | 212/271 |
| 5,934,038 | A | * | 8/1999 | Clausen | B66C 1/0212 |
| | | | | | 52/745.1 |
| 6,000,898 | A | * | 12/1999 | Sharp | E04G 21/168 |
| | | | | | 414/800 |
| 6,966,448 | B1 | * | 11/2005 | Burkett | E02D 7/18 |
| | | | | | 212/231 |
| 8,818,547 | B2 | * | 8/2014 | McAdoo | E04C 3/17 |
| | | | | | 29/897.31 |
| 9,353,519 | B2 | * | 5/2016 | Williams | B27F 7/006 |
| 10,427,916 | B1 | * | 10/2019 | Fisher | B66C 23/36 |
| 10,633,887 | B1 | * | 4/2020 | Fisher | E04H 17/263 |
| 10,865,578 | B2 | * | 12/2020 | Pivac | B60P 1/36 |
| 11,230,032 | B2 | * | 1/2022 | Post | E04B 1/3505 |
| 11,920,347 | B2 | * | 3/2024 | Freidenberger | B25J 9/0096 |
| 11,958,193 | B2 | * | 4/2024 | Pivac | B25J 19/0025 |
| 11,992,958 | B2 | * | 5/2024 | Lozier | B25J 9/163 |
| 12,214,500 | B2 | * | 2/2025 | Pivac | G05D 1/0282 |
| 12,286,804 | B2 | * | 4/2025 | Pettit | E04G 21/0427 |
| 2006/0062655 | A1 | * | 3/2006 | Harrelson | B66F 9/065 |
| | | | | | 414/10 |
| 2006/0283105 | A1 | * | 12/2006 | Bertrand | B27M 3/0073 |
| | | | | | 52/122.1 |
| 2008/0172983 | A1 | * | 7/2008 | Urmson | B27M 1/08 |
| | | | | | 52/745.19 |
| 2011/0056147 | A1 | * | 3/2011 | Beaudet | E04B 1/34869 |
| | | | | | 52/79.9 |
| 2012/0110928 | A1 | * | 5/2012 | Liberman | E04G 21/14 |
| | | | | | 52/122.1 |
| 2012/0324693 | A1 | * | 12/2012 | Yamamoto | B25J 9/1687 |
| | | | | | 29/407.08 |
| 2013/0067832 | A1 | * | 3/2013 | Collins | E04H 1/06 |
| | | | | | 52/125.1 |
| 2013/0205688 | A1 | * | 8/2013 | Muirhead | E04G 21/14 |
| | | | | | 52/143 |
| 2015/0308096 | A1 | * | 10/2015 | Merhi | E04G 21/14 |
| | | | | | 52/745.1 |

| | | | | | |
|---|---|---|---|---|---|
| 2016/0376784 | A1 | * | 12/2016 | Timur | E04H 1/005 |
| | | | | | 52/27 |
| 2017/0203468 | A1 | * | 7/2017 | Sherman | E04G 21/0445 |
| 2017/0350115 | A1 | * | 12/2017 | Rocher | B29C 64/209 |
| 2018/0345487 | A1 | * | 12/2018 | Sandhu | B25J 9/02 |
| 2019/0100934 | A1 | * | 4/2019 | Ansari | E04H 5/02 |
| 2019/0315016 | A1 | * | 10/2019 | Post | E04B 1/35 |
| 2020/0199862 | A1 | * | 6/2020 | Le Roux | E04G 21/0427 |
| 2020/0361088 | A1 | * | 11/2020 | Diaz | B25J 9/1687 |
| 2021/0016438 | A1 | * | 1/2021 | Pivac | G01S 17/42 |
| 2021/0154950 | A1 | * | 5/2021 | Czinger | B25J 9/1687 |
| 2021/0189747 | A1 | * | 6/2021 | Pearson, Jr. | B25J 5/007 |
| 2022/0010543 | A1 | * | 1/2022 | Pitt | E04B 1/34869 |
| 2023/0147866 | A1 | * | 5/2023 | Pickering | E04B 2/7457 |
| | | | | | 52/79.1 |
| 2023/0392368 | A1 | * | 12/2023 | Buran | E04B 1/388 |
| 2024/0051178 | A1 | * | 2/2024 | Bellissimo | B27F 7/155 |
| 2024/0060286 | A1 | * | 2/2024 | Collingwood | E04B 1/34846 |
| 2024/0084610 | A1 | * | 3/2024 | Ghaemi osguoie | B25J 9/0084 |
| 2024/0295117 | A1 | * | 9/2024 | Webster | E04B 1/383 |
| 2025/0207385 | A1 | * | 6/2025 | Tang | E04B 1/35 |

FOREIGN PATENT DOCUMENTS

| | | | | | |
|---|---|---|---|---|---|
| CN | 206869867 | U | * | 1/2018 | |
| CN | 114319600 | A | * | 4/2022 | E04B 1/41 |
| CN | 117365068 | A | * | 1/2024 | E04F 21/22 |
| CN | 119145658 | A | * | 12/2024 | B66C 13/08 |
| DE | 102008023670 | B3 | * | 12/2009 | E04G 21/16 |
| EP | 1747856 | A2 | * | 1/2007 | B25J 9/0084 |
| EP | 1801301 | A1 | * | 6/2007 | E04G 23/0266 |
| EP | 2140754 | A1 | * | 1/2010 | E04G 21/16 |
| EP | 2939796 | A2 | * | 11/2015 | B25J 5/007 |
| EP | 4234179 | A1 | * | 8/2023 | B25J 9/08 |
| IN | 202521028330 | A | | 4/2025 | |
| JP | 2007518586 | A | * | 7/2007 | B29C 64/118 |
| KR | 20250112256 | A | * | 7/2025 | B05C 5/0208 |
| WO | WO-9525210 | A1 | * | 9/1995 | E04G 21/16 |
| WO | WO-2005070657 | A1 | * | 8/2005 | B29C 64/118 |
| WO | WO-2007102773 | A1 | * | 9/2007 | E04B 1/04 |
| WO | WO-2010070082 | A1 | * | 6/2010 | E04B 2/96 |
| WO | WO-2013075023 | A2 | * | 5/2013 | E04B 1/34807 |
| WO | WO-2014147403 | A1 | * | 9/2014 | E04H 1/005 |
| WO | WO-2018101891 | A1 | * | 6/2018 | E04B 3/3483 |
| WO | WO-2019027311 | A1 | * | 2/2019 | B25J 9/16 |
| WO | WO-2019075521 | A1 | * | 4/2019 | E04G 11/54 |
| WO | WO-2019193285 | A1 | * | 10/2019 | E04F 21/1872 |
| WO | WO-2020046908 | A1 | * | 3/2020 | B25J 11/0075 |
| WO | WO-2022103662 | A1 | * | 5/2022 | E04C 3/17 |
| WO | WO-2025048862 | A1 | * | 3/2025 | E04B 1/35 |

* cited by examiner

STRUCTURAL UNITS AND METHODS OF MODULAR MANUFACTURING OF STRUCTURAL UNITS

FIELD OF THE INVENTION

The present invention generally relates to the field of manufacturing. In particular, the present invention is directed to structural units and methods of modular manufacturing of structural units.

BACKGROUND

Modular and factory-built structures may allow for more cost-effective alternative to traditional construction. However, a persistent challenge in this approach is the structural inconsistency that arises when separate components such as walls, floors, and roofs are built individually and then joined together. This segmented assembly process often leads to misalignments, cracks, and gaps that compromise structural integrity and require time-consuming post-assembly adjustments.

SUMMARY OF THE DISCLOSURE

In an aspect, a method for modular manufacturing of a structural unit is described. The method including affixing a plurality of structural components to an automated assembly system, wherein the plurality of structural components includes at least one roof and at least one wall, orienting the plurality of structural components using the automated assembly system, securing each of the plurality of structural components together using one or more precision locking mechanisms, forming a structural unit with the plurality of structural components and removing the automated assembly system from the structural unit.

In another aspect, a structural unit is described. The structural unit is manufactured by affixing a plurality of structural components to an automated assembly system, wherein the plurality of structural components includes at least one roof and at least one wall, orienting the plurality of structural components using the automated assembly system, securing each of the plurality of structural components together using one or more precision locking mechanisms, forming the structural unit with the plurality of structural components and removing the automated assembly system from the structural unit.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for modular man factoring of a structural unit. In an embodiment, an automated assembly system includes one or more robotic arm assemblies, dimensional verification sensors, a machine vision system, and a central controller configured to receive digital blueprints and manipulate structural components into a desired orientation using data-driven command generation.

Aspects of the present disclosure can be used to identify, position, and join structural components into a structural unit with high precision and minimal human intervention. Aspects of the present disclosure can also be used to evaluate the structural integrity of components, detect and adapt to component defects, and ensure proper assembly alignment using precision locking mechanisms and quality control subsystems. This is so, at least in part, because the automated assembly system integrates machine vision-guided verification, digital blueprint interpretation, and active feedback from sensor subsystems to dynamically orient and secure components with positional accuracy, structural stability, and real-time adaptability.

Aspects of the present disclosure allow for fully or semi-automated fabrication of framed modular assemblies, such as prefabricated walls, floors, or roof sections, using standardized materials and industrial techniques (e.g., NAAMS fixtures, quick-lock joints, or automated fastening). Exemplary embodiments illustrating aspects of the present disclosure are described below in the context of several specific examples.

Figure 1:
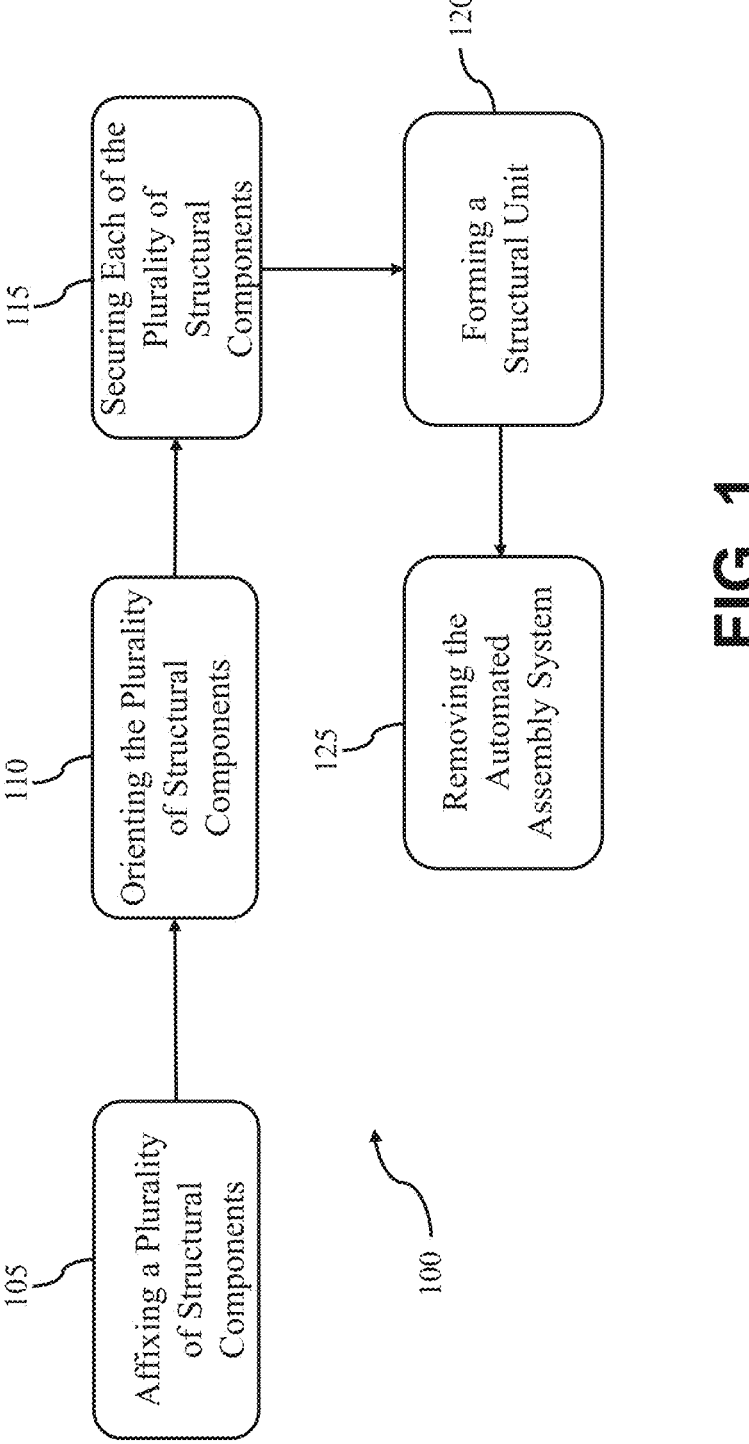
FIG. 1 is a flow diagram illustrating a method of modular manufacturing of a structural unit.

Referring now to FIG. 1, a method 100 for modular manufacturing of a structural unit is described. "Modular manufacturing" as described in this disclosure in which products are built using prefabricated, standardized units or modules that are independently constructed and then assembled into a final product. In one or more embodiments, modular manufacturing is a computer-driven construction process in which all structural components of a building are precisely positioned, aligned, and assembled simultaneously within a controlled environment. In one or more embodiments, modular manufacturing may include the use of preselected components, such as windows, doors and/or the like. In one or more embodiments, modular manufacturing may include the components that have been prefabricated prior to use and already conform the specific sizes. For example, and without limitation, in modular manufacturing, walls, roofs, floors and/or the like may be prefabricated in a factory and/or differing environment, wherein manufacturing of a home may include assembling the prefabricated products. In one or more embodiments, modular manufacturing may be used to create and/or produce a structural unit. A "structural unit" as described in this disclosure refers to a is an assembled, self-supporting section of a building. For example, and without limitation structural unit may include a complete modular room or segment that integrates walls, floors, and roofing components into a single, cohesive form. In one or more embodiments, structural unit may be constructed as a unified whole with precise alignment and secure joining of all structural elements. In one or more embodiments, structural unit may include a singular structure containing multiple components which have been joined together. In one or more embodiments, a structural unit may include a house, a factory, a building and/or any other enclosed space. In one or more embodiments, structural unit may include any structure that has been creating by joining and/or affixing multiple structural components.

With continued reference to FIG. 1, at step 105, method 100 includes affixing a plurality of structural components to an automated assembly system. A "structural component" as described in this disclosure is an individual building element of a structural unit. For example, and without limitation, structural component may include a wall, a roof, a floor, a window, a door, a beam, columns, floor panels, roof sections, framing members and/or the like. In one or more embodiments, structural component may include individual components that make up a house, enclosed area and/or any structural units. In one or more embodiments, structural component may include wooden beams, windows, prefabricated doors, an assembled roof and/or the like. In one or more embodiments, structural component may contribute to a load-bearing framework or overall stability of a structure. In one or more embodiments, structural components may include processed materials, such as steel beams, prefabricated walls, 2×4 wood beams and/or the like. In one or more embodiments, structural components may include any materials that are capable of supporting a structural unit and/or any materials needed to produce structural unit.

With continued reference to FIG. 1, an "automated assembly system" as described in this disclosure is a computer-controlled setup designed to perform the assembly of structural components into finished products. In one or more embodiments, automated assembly system may include a coordinated mechanical, electrical, or automated platform designed to position, align, and join structural components of a modular or factory-built house in a precise and synchronized manner. In one or more embodiments, automated assembly system may include robotic arms, actuated clamps, alignment guides, precision locking mechanisms, control software and/or the like that work together to ensure that structural components are held in place and properly aligned in order to create structural unit. In one or more embodiments, automated assembly system may be responsible for maintaining spatial accuracy, applying fastening or locking forces, and supporting quality control throughout a build process.

With continued reference to FIG. 1, in one or more embodiments, automated assembly system may include a central controller. In one or more embodiments, automated assembly system includes a processor and/or a controller containing at least a processor. Processor may include, without limitation, any processor described in this disclosure. Processor may be included in a and/or consistent with central controller. In one or more embodiments, processor may include a multi-core processor. In one or more embodiments, multi-core processor may include multiple processor cores and/or individual processing units. "Processing unit" for the purposes of this disclosure is a device that is capable of executing instructions and performing calculations for a central controller. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor may include a plurality of multi-core processors. Central controller may include any computing device as described in this disclosure, including without limitation a microcontroller, microprocessor, digital signal processor (DSP) and/or system on a chip (SoC) as described in this disclosure. Central controller may include, be included in, and/or communicate with a mobile device such as a mobile telephone or smartphone. Central controller may include a single computing device operating independently or may include two or more computing devices operating in concert, in parallel, sequentially or the like; two or more computing devices may be included together in a single computing device or in two or more computing devices. Central controller may interface or communicate with one or more additional devices as described below in further detail via a network interface device. Network interface device may be utilized for connecting central controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a central controller. Central controller may include but is not limited to, for example, a central controller or cluster of computing devices in a first location and a second computing device or cluster of computing devices in a second location. Central controller may include one or more computing devices dedicated to data storage, security, distribution of traffic for load balancing, and the like. Central controller may distribute one or more computing tasks as described below across a plurality of computing devices of central controller, which may operate in parallel, in series, redundantly, or in any other manner used for distribution of tasks or memory between computing devices. Central controller may be implemented, as a non-limiting example, using a "shared nothing" architecture.

With continued reference to FIG. 1, central controller may be designed and/or configured to perform any method, method step, or sequence of method steps in any embodiment described in this disclosure, in any order and with any degree of repetition. For instance, central controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Central controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, central controller may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, automated assembly system may include a memory communicatively connected to processor, wherein the memory contains instructions configuring processor to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a central controller. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory may include a primary memory and a secondary memory. "Primary memory" also known as "random access memory" (RAM) for the purposes of this disclosure is a short-term storage device in which information is processed. In one or more embodiments, during use of central controller, instructions and/or information may be transmitted to primary memory wherein information may be processed. In one or more embodiments, information may only be populated within primary memory while a particular software is running. In one or more embodiments, information within primary memory is wiped and/or removed after central controller has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor may access the information from primary memory.

Still referring to FIG. 1, automated assembly system may include a database. Database may include a remote database. Database may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in database may be flagged with or linked to one or more additional elements of information, which may be reflected in data entry cells and/or in linked tables such as tables related by one or more indices in a relational database. In one or more embodiments, database may include a remote database. A "remote database" as described in this disclosure is a is a database that is hosted on a server or computing system that is not located on the same physical machine as the client accessing it. Instead, it is accessed over a network, such as a local area network (LAN), a wide area network (WAN), or the internet. In one or more embodiments, central controller may be communicatively connected to remote database, wherein central controller may receive and/or transmit any data as described in this disclosure. Persons skilled in the art, upon reviewing the entirety of this disclosure, will be aware of various ways in which data entries in database may store, retrieve, organize, and/or reflect data and/or records.

With continued reference to FIG. 1, automated assembly system may include and/or be communicatively connected to a server, such as but not limited to, a remote server, a cloud server, a network server and the like. In one or more embodiments. In one or more embodiments, central controller may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device. In one or more embodiments, central controller may transmit processes to server wherein central controller may conserve power or energy.

With continued reference to FIG. 1, automated assembly system may include one or more cameras. As used in this disclosure, a "camera" is a device that is configured to sense electromagnetic radiation, such as without limitation visible light, and generate an image representing the electromagnetic radiation. In one or more embodiments, a camera may include one or more optics. Exemplary non-limiting optics include spherical lenses, aspherical lenses, reflectors, polarizers, filters, windows, aperture stops, and the like. In one or more embodiments, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In one or more embodiments, a camera may be sensitive within a non-visible range of electromagnetic radiation, such as without limitation infrared. As used in this disclosure, "image data" is information representing at least a physical scene, space, and/or object. In one or more embodiments, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. In one or more embodiments, camera may be configured to capture one or more images. In one or more embodiments, camera may be configured to capture one or more images and/or videos of a scene, surrounding environment and/or the like. This will be described in further detail below.

With continued reference to FIG. 1, automated assembly system includes a machine vision system. A "machine vision system" as described in this disclosure as refers to a hardware or software system configured to capture, process, and interpret visual data from one or more imaging devices. In one or more embodiments, automated assembly system may include a machine vision system that includes at least a camera. A "camera" as described in this disclosure is an optical device configured to capture visual data in the form of still images or video. In one or more embodiments, machine vision system may include and/or be included in central controller. In one or more embodiments, steps and/or processes of machine vision system may be performed on central controller. A machine vision system may use images from at least a camera, to make a determination about a scene, space, and/or object. For example, in one or more embodiments a machine vision system may be used for world modeling or registration of objects within a space. In one or more embodiments, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In one or more embodiments, registration may include one or more transformations to orient a camera frame (or an image or video stream) relative a three-dimensional coordinate system; exemplary transformations include without limitation homography transforms and affine transforms. In one or more embodiments, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In one or more embodiments, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In one or more embodiments, a machine vision system may use a classifier, such as any classifier described throughout this disclosure.

With continued reference to FIG. 1, in one or more embodiments, camera may include a range-imaging camera. An exemplary range-imaging camera that may be included in machine vision system is Intel® RealSense™ D430 Module, from Intel® of Mountainview, California, U.S.A. D430 Module comprises active infrared (IR) illumination and a stereoscopic camera, having global shutters and frame rate of up to 90 fps. D430 Module provide a field of view (FOV) of 85.2° (horizontal) by 58° (vertical) and an image resolution of 1280×720. Range-sensing camera may be operated independently by dedicated hardware, or, in one or more embodiments, range-sensing camera may be operated by a central controller. In one or more embodiments, range-sensing camera may include software and firmware resources (for execution on hardware, such as without limitation dedicated hardware or a central controller). D430 Module may be operating using software resources including Intel® RealSense™ SDK 2.0, which include opensource cross platform libraries.

With continued reference to FIG. 1, in one or more embodiments, camera may include a machine vision camera. An exemplary machine vision camera that may be included in machine vision system is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

With continued reference to FIG. 1, camera may include a stereo camera. As used in this disclosure, a "stereo-camera" is a camera that senses two or more images from two or more vantages. As used in this disclosure, a "vantage" is a location of a camera relative a scene, space and/or object which the camera is configured to sense. In one or more embodiments, a stereo-camera may determine depth of an object in a scene as a function of parallax. As used in this disclosure, "parallax" is a difference in perceived location of a corresponding object in two or more images. An exemplary stereo-camera is TaraXL from e-con Systems, inc of San Jose, California. TaraXL is a USB 3.0 stereo-camera which is optimized for NVIDIA® Jetson AGX Xavier™/ Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm.

With continued reference to FIG. 1, camera may be configured to capture images of a scene, such as for example, a surrounding environment of automated assembly system. In one or more embodiments, camera may be configured to capture images of structural components, a surrounding space of automated assembly system and/or the like.

With continued reference to FIG. 1, camera may be configured to capture one or more images of a scene, wherein machine vision system may be configured to capture and/or identify one or more structural components within a scene. In one or more embodiments, camera may be configured to capture image data, wherein machine vision system may be configured to identify one or more structural components within image data. This will be described in further detail below.

With continued reference to FIG. 1, automated assembly system may include one or more mechanical and/or electrical components (also referred to herein as "components of the automated assembly system"). In one or more embodiments, components of automated assembly system may include one or more robotic arm assemblies. A "robotic arm assembly," as described in this disclosure, refers to a programmable mechanical arm with one or more axes of movement. In one or more embodiments, robotic arm assembly may be designed to perform precise positioning, handling, or manipulation tasks during the assembly process. In one or more embodiments, a robotic arm assembly may be configured to hold, support, and/or position structural components during manufacturing and/or assembly of structural unit. In one or more embodiments, multiple robotic arms may be used in coordination to stabilize or manipulate large or heavy components, enabling simultaneous positioning and alignment of multiple parts within automated assembly system. In one or more embodiments, automated assembly system may include one or more robotic arms assemblies, wherein each robotic arms assembly may be configured to hold and secure a single structural component. For example and without limitation, a first robotic arm assembly may be configured to hold a wall, while a second robotic arm assembly may be configured to hold a roof. In one or more embodiments, the robotic arm assembly may include a base unit that anchors the arm to a fixed surface, such as the floor or a structural frame. Robotic arm assembly may further include linear and rotary joints, providing the robotic arm with a wide range of motion across multiple axes. Movement may be driven by integrated motors and actuators, which enable precise and repeatable control of the arm's positioning as described in further detail below. In one or more embodiments, Sensors and encoders may be incorporated to detect joint positions and monitor movement in real time, allowing for responsive adjustments and feedback-controlled operation. At a distal end of the robotic arm, a mount may be provided to securely hold tooling or grippers, which can engage with and stabilize structural components during assembly. In one or more embodiments, robotic arm may be reconfigurable or interchangeable depending on the size, type, or orientation of the component being assembled.

With continued reference to FIG. 1, components of automated assembly system may include a power supply unit. In one or more embodiments, power supply unit may include a battery, a cable for connection to a wall outlet, a cooling system, internal sensors and/or the like.

With continued reference to FIG. 1, in one or more embodiments, automated assembly system may include one or more latching mechanisms integrated into one or more robotic arm assemblies or other holding devices. These latching mechanisms may be configured to securely hold and orient structural components during the manufacturing and assembly process, ensuring stable positioning and minimizing unwanted movement. In one or more embodiments, latching mechanisms may include mechanical clamps, toggle clamps, magnetic clamps, vacuum-based grippers, pneumatic or hydraulic actuated locks, or spring-loaded catches. These mechanisms may be designed to engage with specific features of the structural components, such as edges, surfaces, or pre-installed fixtures, to provide reliable attachment during handling and assembly. In one or more embodiments, the latching mechanisms may be adjustable or configurable to accommodate a range of component sizes, shapes, and materials. The mechanisms may be integrated with sensors or feedback systems to verify secure engagement and proper orientation before and during assembly operations.

With continued reference to FIG. 1, components of automated assembly system may be powered, manipulated and/or actuated using actuators and/or motors. An actuator may include a component of a machine that is responsible for moving and/or controlling a mechanism or system. An actuator may, in one or more embodiments, require a control signal and/or a source of energy or power. In one or more embodiments, a control signal may be relatively low energy. Exemplary control signal forms include electric potential or current, pneumatic pressure or flow, or hydraulic fluid pressure or flow, mechanical force/torque or velocity, or even human power. In one or more embodiments, an actuator may have an energy or power source other than control signal. This may include a main energy source, which may include for example electric power, hydraulic power, pneumatic power, mechanical power, and the like. In one or more embodiments, upon receiving a control signal, an actuator responds by converting source power into mechanical motion. In one or more embodiments, an actuator may be understood as a form of automation or automatic control.

With continued reference to FIG. 1, in one or more embodiments, actuator may include a hydraulic actuator. A hydraulic actuator may consist of a cylinder or fluid motor that uses hydraulic power to facilitate mechanical operation.

Output of hydraulic actuator may include mechanical motion, such as without limitation linear, rotary, or oscillatory motion. In one or more embodiments, hydraulic actuator may employ a liquid hydraulic fluid. As liquids, in one or more embodiments. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In one or more embodiments, a hydraulic cylinder may be considered single acting. Single acting may be used when fluid pressure is applied substantially to just one side of a piston. Consequently, a single acting piston can move in only one direction. In one or more embodiments, a spring may be used to give a single acting piston a return stroke. In one or more embodiments, a hydraulic cylinder may be double acting. Double acting may be used when pressure is applied substantially on each side of a piston; any difference in resultant force between the two sides of the piston causes the piston to move.

With continued reference to FIG. 1, in one or more embodiments, actuator may include a pneumatic actuator. In one or more embodiments, a pneumatic actuator may enable considerable forces to be produced from relatively small changes in gas pressure. In one or more embodiments, a pneumatic actuator may respond more quickly than other types of actuators, for example hydraulic actuators. A pneumatic actuator may use compressible flued (e.g., air). In one or more embodiments, a pneumatic actuator may operate on compressed air. Operation of hydraulic and/or pneumatic actuators may include control of one or more valves, circuits, fluid pumps, and/or fluid manifolds.

With continued reference to FIG. 1, in one or more embodiments, actuator may include an electric actuator. Electric actuator may include any of electromechanical actuators, linear motors, and the like. In one or more embodiments, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In one or more embodiments, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In one or more embodiments, a linear motor may cause lower friction losses than other devices. Linear motors may be further specified into at least 3 different categories, including flat linear motor, U-channel linear motors and tubular linear motors. Linear motors may be controlled be directly controlled by a control signal for controlling one or more linear motor parameters. Exemplary linear motor parameters include without limitation position, force, velocity, potential, and current.

With continued reference to FIG. 1, in one or more embodiments, an actuator may include a mechanical actuator. In one or more embodiments, a mechanical actuator may function to execute movement by converting one kind of motion, such as rotary motion, into another kind, such as linear motion. An exemplary mechanical actuator includes a rack and pinion. In one or more embodiments, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, at least one actuator and/or motor may be coupled to at least one robotic arm assembly. The term "coupled" as described in this disclosure refers to a mechanical, electrical, or functional connection between two components, such that the one component can transmit motion, force, or control to another component. In one or more embodiments, actuator may be coupled to robotic arm assembly such that actuator can transmit motion, force, or control to the arm or one of its joints. This coupling may be direct, such as a motor shaft connected to a rotating joint, or indirect, such as through gears, linkages, or drive systems. In one or more embodiments, coupling may enable actuator to control the movement or positioning of the robotic arm with precision. In one or more embodiments, actuator may be communicatively connected to central controller, wherein actuator may receive commands in the form of signals and manipulate robotic arm through the receipt of signals. In one or more embodiments, actuation of actuator may result in manipulation of robotic arm assembly.

With continued reference to FIG. 1, automated assembly system and/or components of automated assembly system may include one or more sensors. In one or more embodiments, sensor may include one or more sensors. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal such as a voltage with respect to a reference. Sensor may detect a plurality of data. A plurality of data detected by sensor may include, but is not limited to temperature, humidity levels, motion and/or the like. In one or more embodiments, and without limitation, sensor may include a plurality of sensors.

With continued reference to FIG. 1, sensor may include a plurality of independent sensors, where any number of the described sensors may be used to detect any number of physical, electrical and or thermal quantities associated within automated assembly system. Independent sensors may include separate sensors measuring physical or thermal quantities that may be powered by and/or in communication with circuits independently, where each may signal sensor output to a control circuit such as a user graphical interface. In an embodiment, use of a plurality of independent sensors may result in redundancy and thus be configured to employ more than one sensor that measures the same phenomenon, those sensors being of the same type, a combination of, or another type of sensor not disclosed, so that in the event one sensor fails, the ability of sensor to detect phenomenon may be maintained.

Still referring to FIG. 1, sensor may include a motion sensor. A "motion sensor," for the purposes of this disclosure, refers to a device or component configured to detect physical movement of robotic arm, structural component and/or any other components of automated assembly system. One of ordinary skill in the art would appreciate, after reviewing the entirety of this disclosure, that motion may include a plurality of types including but not limited to:

spinning, rotating, oscillating, gyrating, jumping, sliding, reciprocating, or the like. Sensor may include, torque sensor, gyroscope, accelerometer, torque sensor, magnetometer, inertial measurement unit (IMU), pressure sensor, force sensor, proximity sensor, displacement sensor, vibration sensor, among others.

With continued reference to FIG. 1, sensor may include a moisture sensor. "Moisture," as used in this disclosure, is the presence of water, which may include vaporized water in air, condensation on the surfaces of objects, or concentrations of liquid water. Moisture may include humidity. "Humidity," as used in this disclosure, is the property of a gaseous medium (almost always air) to hold water in the form of vapor. In an embodiment, a moisture sensor may include a hygrometer. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. Humidity sensor may be psychrometer. Humidity sensor may be a hygrometer. Humidity sensor may be configured to act as or include a humidistat. A "humidistat," for the purposes of this disclosure, is a humidity-triggered switch, often used to control another electronic device. Humidity sensor may use capacitance to measure relative humidity and include in itself, or as an external component, include a device to convert relative humidity measurements to absolute humidity measurements.

With continued reference to FIG. 1, sensor may include thermocouples, thermistors, thermometers, infrared sensors, resistance temperature detectors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor, may be measured in Fahrenheit (° F.), Celsius (° C.), kelvin (K), Rankine (° R), or another scale alone or in combination. The temperature measured by sensors may comprise electrical signals, which are transmitted to their appropriate destination wireless or through a wired connection.

With continued reference to FIG. 1, sensor may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like. Sensor may be configured to detect a plurality of data, as discussed further below in this disclosure. A plurality of data may be detected from sensor.

With continued reference to FIG. 1, sensor may include a sensor suite which may include a plurality of sensors that may detect similar or unique phenomena. For example, in a non-limiting embodiment, a sensor suite may include a plurality of voltmeters or a mixture of voltmeters and thermocouples. Automated assembly system may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a control circuit. In an embodiment, use of a plurality of independent sensors may result in redundancy and thus be configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 1, in one or more embodiments, automated assembly system may include dimensional verification sensors integrated into one or more components of the system, including the robotic arm assembly. A "dimensional verification sensor" as described in this disclosure, is a sensor device configured to measure the positioning of one or more objects or structural components. In one or more embodiments, dimensional verification sensor may provide real-time feedback related to attributes of structural components such as angular orientation, spacing, height, edge alignment, planar deviation and/or the like to ensure that structural components are positioned and assembled according to predefined specifications. In one or more embodiments, dimensional verification sensors may include optical sensors, laser distance sensors, vision systems, infrared sensors, ultrasonic sensors, or combinations thereof. These sensors may be configured to detect precise spatial relationships between structural components and the robotic arms, enabling real-time feedback and adjustments during structural component handling and positioning. In one or more embodiments, dimensional verification sensors may be mounted at various locations on the robotic arm assembly, such as on the distal end effector (e.g., near or on the component mount), along the arm segments, or near joint locations. Placement of the sensors may be optimized to provide maximum field of view and measurement accuracy for detecting features such as edge alignment, surface flatness, corner positioning, and proper orientation of each structural component. In one or more embodiments, the sensors may work in conjunction with computing device of the automated assembly system to provide closed-loop feedback. Sensor data received from sensors may be used to compare actual structural component positions against predefined tolerances stored in a digital model or build plan. If deviations are detected, robotic arm assembly may be instructed to reposition the component or pause assembly for corrective action. In one or more embodiments, the dimensional verification sensors may also detect and compensate for variations in material thickness, thermal expansion, or manufacturing inconsistencies, ensuring that all structural components are joined with consistent alignment and spacing.

With continued reference to FIG. 1, in one or more embodiments, dimensional verification sensors may be configured to monitor at least a spacing tolerance between or more two structural components. A "spacing tolerance" as described in this disclosure refers to an allowable variation or acceptable range in a distance or gap between two adjacent components within an assembly. For example, and without limitation, a blueprint for creatin structural unit may allow for spatial variation of 1-2 inches between structural components, wherein dimensional verification sensors may be used to identify and verify that structural components are within the allowable spatial variation. In one or more embodiments, dimensional verification sensors may be configured to monitor spatial variation between two structural components by detecting the distance separating them. These sensors may utilize technologies such as laser range finding, optical scanning, or ultrasonic measurement to capture accurate positional data in real time. By continuously monitoring the gap or spacing, dimensional verification sensors may provide feedback to automated assembly system, enabling adjustments to maintain components within specified tolerance limits. Dimensional verification sensors are described in further detail below.

With continued reference to FIG. 1, sensors may be configured to transmit a sensor output signal representative of sensed information. As used in this disclosure, a "sensor signal" is a representation of a sensed information that sensor may generate. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

With continued reference to FIG. 1, exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in one or more embodiments, a signal may be modeled with a probability distribution indicating noise, which then may be used to reduce noise in a processed signal.

With continued reference to FIG. 1, central controller is communicatively connected to components of automated assembly system. In one or more embodiments, computing device may transmit and/or receive information to or from components of automated assembly system such as machine vision system. In one or more embodiments, information may be transmitted in the form of signals. In one or more embodiments, computing device may control components of automated assembly through the generation and transmission of commands.

With continued reference to FIG. 1, automated assembly may be configured to perform one or more manufacturing-related actions upon receipt of a signal. As used herein, the term "signal" refers to any intelligible representation of data capable of conveying instructions, commands, or information between components or devices. In one or more embodiments, a signal may include, but is not limited to, an optical signal, a pneumatic signal, a hydraulic signal, a mechanical signal, an electrical signal, a digital signal, or an analog signal. In one or more embodiments, signal may be used to communicate with computing device, which may be integrated with and/or operatively connected to automated assembly system. The signal may be transmitted and/or received by way of one or more input/output (I/O) interfaces or communication ports. For example, analog signals originating from sensors (e.g., temperature, voltage, or current sensors) may be converted to digital signals via one or more analog-to-digital converters (ADCs) before further processing by central controller. In one or more embodiments, analog signals may undergo signal conditioning or filtering prior to digitization. In one or more embodiments, digital signals may be generated by or transmitted between various components of the automated assembly system, including without limitation a robotic arm assembly, sensor suite, machine vision system and/or the like. In one or more embodiments, digital signals may be communicated via one or more standardized communication protocols, including but not limited to internet protocol (IP), controller area network (CAN) bus protocols, serial communication protocols (e.g., universal asynchronous receiver-transmitter [UART]), parallel bus protocols, industrial Ethernet, and similar interfaces. In one or more embodiments, a signal may include, or may be associated with, a control command or instruction executable by automated assembly system and/or components thereof. Upon receipt of such a signal, components of automated assembly system may be configured to initiate, adjust, or terminate specific manufacturing operations. These actions may include, for example, orientating structural components, positioning structural components and/or the like.

With continued reference to FIG. 1, step 105 includes affixing plurality of structural components to an automated assembly system, wherein the plurality of structural components includes at least one roof and at least one wall. As described in this disclosure, "affixing plurality of components to automated assembly system" refers to a process in which structural components are attached to, secured ton or placed in a defined area relative to automated assembly system. In one or more embodiments, a process for affixing structural components may include securing structural components to each robotic arm assembly. In one or more embodiments, structural components may be affix through the use of latching mechanisms as described above. In one or more embodiments, each structural component may be affixed to one or more robotic arm assemblies. In one or more embodiments, structural components may be affixed to automated assembly system such that automated assembly system is capable of orienting, repositioning and/or manipulating components. In one or more embodiments, affixing structural components may include rigidly attaching structural component to automated assembly system wherein movement of a particular components of automated assembly system may result in similar movement of structural components. In one or more embodiments, structural components may be affixed to automated assembly system such that structural components are in contact with automated assembly system. In one or more embodiments, affixing structural components to automated assembly system may include placing structural components in a field of view of automated assembly system wherein machine vision system may identify structural components and grab them using robotic arm assemblies. In one or more embodiments, structural components may include predetermined points and/or portions on structural components that may be used to indicate which portions of structural components should be affixed to automated assembly system. For example and without limitation, structural components may include visual markers that indicate what portion of structural components should be in contact with automated assembly system. In one or more embodiments, visual markers may include identifying colors, latching mechanisms, words, phrases and/or the like. In one or more embodiments, structural components may be affixed to automated assembly system based on predefined and/or predetermined parameters. For example, and without limitation, a blueprint or set of instructions may dictate which structural components are needed, which structural components are affixed to which structural arm, how many structural components are needed, where to place structural components, which direction to orient structural components relative to automated assembly system and/or the like.

With continued reference to FIG. 1, at step 110, method 100 includes orienting the plurality of structural components using the automated assembly system. As described in this disclosure "orienting" refers to a process in which components are positioned in a specific angular or spatial direction. In one or more embodiments, orientating may include changing an angular relationship between two structural components, such as a wall and a roof. In one or more embodiments, orienting may include changing a spatial relationship such as a distance between two structural components. In one or more embodiments, a process of orienting structural component may include positioning structural components in order to manufacture and/or build structural unit. In one or more embodiments, robotic arms assemblies may be configured to change orientations and/or distances of structural components to ensure they are in proper locations for use in manufacturing structural unit. In one or more embodiments, automated assembly system may orient each structural component such that they are located in correct locations relative to a blueprint instruction set and/or the like. For example, and without limitation, a blueprint may indicate that a structural component containing a roof should be positioned 10 feet above and vertically from a structural unit containing a floor base. As a result automated assembly system may orient a roof or a floor such that they conform to the blueprint. In one or more embodiments, structural components may be oriented through manipulation of components of automated assembly system such as one or more robotic assemblies. In one or more embodiments, the orientation process may include positioning each structural component at a defined angle, direction, or alignment with respect to adjacent components to ensure proper assembly and structural integration. In one or more embodiments, automated assembly system may include one or more sensors (as described above) configured to detect the position and/or orientation of structural components and robotic arm assemblies. These sensors may include, but are not limited to, optical sensors, machine vision systems, LIDAR, laser triangulation sensors, infrared sensors, or encoders. Sensors may be mounted on robotic arms, integrated into the end effectors, or positioned throughout a surrounding environment of automated assembly system to provide real-time data on the spatial configuration of each structural component and the movement of robotic assemblies. In one or more embodiments, the automated assembly system may determine the relative orientation of structural components by comparing sensor data from multiple points of reference, such as the base of the robotic arm and the surface or edge of a structural component. For example, machine vision systems may scan and map the geometry of a structural component and identify key features, such as corners, edges, or cutouts to determine its current orientation in space. Similarly, rotary encoders and joint sensors may track the exact pose of each robotic arm segment to determine the arm's position relative to the component being handled. In one or more embodiments, the system may use this positional and orientation data to drive adjustments to the robotic arms, allowing for structural components to be rotated, tilted, or translated until the desired orientation is achieved. In one or more embodiments, the orientation process may be iterative, with sensors continuously monitoring alignment and providing feedback for fine-tuned repositioning. The system may also compare real-time orientation data with a digital build model or predefined specifications to verify that all components are within acceptable alignment tolerances before proceeding with joining or affixing operations.

With continued reference to FIG. 1, automated assembly system may be configured to orient structural components by capturing images of the components and analyzing their features using one or more cameras and machine vision systems as described in this disclosure. In one or more embodiments, a camera may be configured to capture an initial image of a structural component positioned within the assembly environment. An "assembly environment" for the purposes of this disclosure refers to a surrounding environment of automated assembly system in which structural unit will be manufactured or created. An "initial image," as described herein, refers to one or more images captured prior to or at the beginning of a processing step, such as alignment, orientation, or joining. In one or more embodiments, the initial image may include visual data related to the geometry, surface features, positioning, and surroundings of the structural component. These images may be used to identify the type of structural component, its location, its orientation in space, and key features such as edges, cutouts, connection points, or alignment references. The camera may also capture subsequent images after the component has been manipulated, to verify changes in orientation or to confirm correct positioning. In one or more embodiments, a controller of automated assembly system may receive the image data or the initial images and utilize machine vision system to analyze the structural component. The machine vision system may apply image classification, edge detection, feature mapping, or 3D scanning techniques to determine the component's identity and spatial orientation. The system may reference a database or library of known structural component profiles to match and classify the component based on its visual characteristics. Based on this analysis, the central controller may determine how the component should be oriented relative to other components in the assembly process. Central controller may then generate control signals to drive robotic arm assemblies to manipulate the component accordingly. The robotic arms may rotate, translate, or tilt the component into the correct position for assembly, using feedback from sensors or subsequent images to ensure the desired orientation has been achieved.

With continued reference to FIG. 1, central controller may utilize machine vision system and/or other image classification techniques as described herein to identify structural components within initial image and/or other images received by camera. In one or more embodiments, central controller may maintain a database or list of known structural component types or characteristics, and machine vision system may be configured to analyze received initial images until the structural component is accurately identified or classified.

With continued reference to FIG. 1, central controller and/or machine vision system may be configured to classify initial images using an image classifier. Computing device may use an image classifier to classify images within any data described in this disclosure. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier may be configured to output at least a datum that labels or otherwise identifies a set of images that are clustered together, found to be close under a distance metric as described below, or the like. Computing device and/or another device may generate image classifier using a classification algorithm, defined as a process whereby central controller derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In one or more embodiments, central controller may use an image classifier to identify a key image in data described in any data described in this disclosure. An image classifier may be trained with binarized visual data that has already been classified to determine key images in any other data described in this disclosure. "Binarized visual data" for the purposes of this disclosure is visual data that is described in binary format. For example, binarized visual data of a photo may be comprised of ones and zeroes wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. In one or more embodiments, image classifier may include an/or be included within machine vision system. An image classifier may receive an input data described in this disclosure and output a key image with the data. As used herein, a "key image" is an element of visual data used to identify and/or match elements to each other. In one or more embodiments, image classifier may be used to compare visual data in data such as initial images, with visual data in another data set. Visual data in another data set may include a plurality of images of structural components located on database. In one or more embodiments, image classifier may identify one or more components within initial images, such as one or more structural components. In the instance of a video captured by camera, central controller may be used to identify a similarity between videos by comparing them. Computing device may be configured to identify a series of frames of video. The series of frames may include a group of pictures having some degree of internal similarity, such as a group of pictures having similar components, scenery, location and the like depicted within them or similar color profiles. In one or more embodiments, comparing series of frames may include video compression by inter-frame coding. The "inter" part of the term refers to the use of inter frame prediction. This kind of prediction tries to take advantage of temporal redundancy between neighboring frames enabling higher compression rates. Video data compression is the process of encoding information using fewer bits than the original representation. Any compression may be either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Data compression may be subject to a space-time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly. In one or more embodiments, image classifier may receive initial images, or any other data described in this disclosure and recognize key images within the data. In one or more embodiments, image classifier may identify structural components edges of structural components, and/or the like.

Continuing to reference FIG. 1, central controller may use a machine learning module, such as any machine learning module herein, to implement one or more algorithms or generate one or more machine-learning models, and calculate data as described herein. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database, such as any database described in this disclosure, or be provided by a user. In other embodiments, a machine-learning module may obtain a training set by querying a communicatively connected database that includes past inputs and outputs. Training data may include inputs from various types of databases, resources, and/or user input and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine learning module may be used to generate a machine learning model and/or any other machine learning model using training data. Machine learning model may be trained by correlated inputs and outputs of training data. Training data may be data sets that have already been converted from raw data whether manually, by machine, or any other method. Training data may be stored in database. Training data may also be retrieved from database.

With continued reference to FIG. 1, central controller and/or central controller may classify data described in this disclosure using a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like.

With continued reference to FIG. 1, central controller may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, central controller and/or machine vision system may identify structural components based on unique visual markers located on structural components. For example and without limitations, structural components may include a series of alphanumeric characters that indicate what the specific structural component is. In one or more embodiments, orientation may further be identified by identifying an orientation of the visual markers, for example an alphanumeric sequence that is oriented 45 degrees relative to camera may indicate that the structural component is oriented 45 degrees. In one or more embodiments, machine vision system and/or an image classifier may identify structural components and their orientation and orient structural components accordingly.

With continued reference to FIG. 1, automated assembly system may be configured to identify structural components as objects of interest using one or more cameras or machine vision systems. As used herein, an "object of interest" refers to a physical item or feature within a camera's field of view that meets predefined criteria relevant to an assembly process. In one or more embodiments, a structural component may constitute the object of interest, and the central controller may be configured to receive and process image data from one or more cameras until the structural component is detected in at least one captured image. In one or more embodiments, a machine vision system integrated with the automated assembly system may include or communicate with an image classifier trained to recognize structural components within captured image frames. The image classifier may apply one or more learned algorithms to analyze image data, extract visual features, and identify candidate regions that match stored representations of known structural component geometries, profiles, or surface features. This identification may be performed using a combination of feature extraction, comparison against a digital reference model or database, and confidence scoring. Detection and identification of the structural component as an object of interest may be a prerequisite for initiating subsequent assembly steps. For example, the automated assembly system may withhold execution of orientation, alignment, or joining operations until the presence and classification of the structural component are confirmed. If no object of interest is detected with sufficient confidence, the central controller may disregard the image data, store it for further review, or continue capturing additional images until successful identification occurs. In one or more embodiments, the machine vision system may include or interface with high-resolution cameras, depth sensors, structured light emitters, stereo imaging systems, or similar equipment capable of capturing detailed surface geometry, depth data, and visual characteristics of structural components. The image data may be processed by embedded processors or the central controller using trained classification and segmentation algorithms. These algorithms may be developed using supervised learning methods with labeled training datasets, enabling the system to recognize specific types of structural components, features such as alignment tabs, predrilled holes, joints, or mounting interfaces, and characteristics such as material edges or contours.

With continued reference to FIG. 1, the machine vision system may employ convolutional neural networks (CNNs), region-based CNNs (R-CNNs), semantic segmentation, or similar deep learning techniques to detect and classify regions within the image data. Identification may further involve edge detection, contour tracing, template matching, or feature point analysis. In one or more embodiments, the system may generate a 3D point cloud or stereo disparity map to aid in localizing and verifying the spatial position and orientation of structural components within the assembly space. The machine vision system or central controller may then compare observed features to a digital representation, such as a CAD model, to verify part conformity and spatial arrangement. Once a structural component has been successfully identified, automated assembly system and/or controller may proceed to determine and adjust its relative orientation, either alone or in conjunction with other components, by using the spatial data to generate movement commands for the robotic arm assemblies. The central controller may also associate identified components with relevant task data, such as alignment instructions or assembly sequences stored in memory. If a component cannot be reliably identified, due to factors such as occlusion, glare, contamination, or deformation, automated assembly system may initiate an alert, trigger corrective adjustments such as repositioning the camera or altering lighting conditions or flag the image for manual inspection before reattempting the identification process.

With continued reference to FIG. 1, in one or more embodiments, automated assembly system may be configured to receive a digital blueprint associated with the structural unit to be manufactured. As used herein, a "digital blueprint" refers to a computer-readable file or dataset containing the dimensional specifications, geometry, spatial arrangement, and assembly instructions for the structural unit. The digital blueprint may include 2D drawings, 3D models (e.g., CAD or BIM files), component identifiers, and metadata specifying connection points, orientation constraints, sequencing, and alignment tolerances between structural components. The blueprint may also encode assembly logic, such as the order of operations or required subassembly groupings. Central controller of automated assembly system may parse the digital blueprint to extract relevant assembly parameters, including the expected number and types of structural components, their intended spatial relationships, and orientation requirements. This data can be cross-referenced with real-time sensor input and machine vision output to validate that the correct components are present and properly positioned. Upon successful identification of individual structural components, automated assembly system may initiate the orienting process. In one or more embodiments, automated assembly system may orient the plurality of structural components based on the spatial data defined in the digital blueprint. Robotic arm assemblies, equipped with actuators, end effectors, and multi-axis motion control, may manipulate the components to achieve the intended configuration. Orientation may involve rotating, translating, or tilting components into alignment with adjacent components or a global assembly axis. In one or more embodiments, the orientation process may be guided by positional and dimensional verification sensors, which provide continuous feedback to central controller. These sensors may detect spacing tolerances, angular alignment, height deviations, and relative displacement between components. In response, the system may execute fine adjustments to ensure that all components match the predefined tolerances specified in the digital blueprint. In one or more embodiments, digital blueprint may further define tolerable deviation thresholds, triggering alerts or correction routines if real-time sensor measurements fall outside those bounds. In one or more embodiments, the orientation step may also include temporary securing of components (in additional to an initial securement) using latching mechanisms, clamping systems, or robotic end effectors while final fastening operations (e.g., welding, nailing, adhesive bonding) are performed. These systems may be selectively engaged or repositioned as needed to accommodate the assembly instructions indicated by the digital blueprint. In one or more embodiments, automated assembly system may receive digital blueprint associated with structural unit and orient the plurality of structural components as a function of the digital blueprint. In one or more embodiments, digital print may be retrieved from a database, may be received by an operator working with automated assembly system, may be transmitted and/or communicated to automated assembly system and/or the like.

With continued reference to FIG. 1, in one or more embodiments, orienting the plurality of structural components may further include continuously monitoring the one or more structural components using plurality of dimensional verification sensors, and dynamically orienting the structural components as a function of the continuous monitoring. In one or more embodiments, the dimensional verification sensors may operate in real-time to monitor parameters such as component tilt, elevation, angular deviation, lateral offset, and edge alignment of structural components. The sensors may also capture dynamic changes in spacing tolerance between structural components as they are being handled or moved into position. As described in this disclosure "Continuous monitoring" refers to continuous real-time data acquisition and analysis throughout the duration of a manufacturing process of structural unit. In one or more embodiments, continuous monitoring may ensures that any deviation from the intended placement may be immediately detected by central controller and prior to completion of a manufacturing process. The central controller processes the sensor data and evaluates it against positional and orientational constraints defined in the digital blueprint. In response to any discrepancies, automated assembly system may performs dynamic orientation adjustments. A "dynamic orientation adjustment" as described in this disclosure refers to a positioning of structural components based on received data from one or more sensors, such as dimensional verification sensors. In one or more embodiments, dynamic orientation may include recalibrating the position of one or more robotic arm assemblies in real time, issuing movement commands to reposition components, or reactivating latching mechanisms to release and realign structural elements. For example, if a wall panel is detected to be out of vertical alignment by more than a preset angular threshold, the automated assembly system may activate specific joints on the robotic arm to correct the tilt before securing the component. In one or more embodiments, central controller may apply predictive modeling and closed-loop control techniques using data from dimensional verification sensors to anticipate drift or positional instability, adjusting robotic movements proactively. In one or more embodiments, automated assembly system may be configured to continuously monitor structural components and dynamically orient structural components based on changes in position or location of structural components.

With continued reference to FIG. 1, central controller may be configured to receive positional data from sensors of automated assembly system. "Positional data" for the purposes of this disclosure refers to information associated with the positioning or orientation of one or more structural components. In one or more embodiments, positional data may include information such as component height, angular deviation, spacing tolerance between adjacent components, lateral or vertical displacement, edge alignment, and rotational offset. In one or more embodiments, positional data may include initial images and/or images captured by camera. In one or more embodiments, position data may be retrieved multiple types of sensors, such as dimensional verification sensors. In one or more embodiments, dimensional verification sensors may include high-resolution cameras, stereo vision systems, LiDAR scanners, and laser displacement devices. In one or more embodiments, central controller may processes this sensor input in real time, either on an ongoing basis or at discrete intervals during the orientation sequence. In one or more embodiments, central controller may continuously capture spatial information relating to the position, orientation, alignment, and spacing of structural components during the assembly process through in the form of positional data. Upon receiving the positional data, central controller may be configured to generate one or more orientation commands as a function of that data. An "orientation command" for the purposes of this disclosure is instructions to transmitted to one or more components of automated assembly system for the purposes of orienting or re-orienting one or more structural components. In one or more embodiments, orientation commands may include specific coordinate positions, angular adjustments, or alignment vectors that are used to reposition structural components into conformance with a predefined arrangement, such as that provided by digital blueprint. The orientation commands may be computed using an internal kinematic model of the robotic arm assemblies, which allows for automated assembly system to calculate precise motion paths and joint adjustments necessary to bring a structural component into its target orientation. In one or more embodiments, central controller may manipulates the robotic arm assembly by actuating one or more actuators as a function of the orientation commands. The actuators, which may include servo motors, pneumatic cylinders, or electromechanical drives, which are coupled to the robotic arm's joints and segments. In one or more embodiments, manipulation may include multi-axis rotation, extension, or retraction of the robotic arm to reposition an end effector such as a gripping tool, latching mechanism, or suction device holding the structural component. The actuation sequence may be executed in a continuous loop, with central controller dynamically adjusting actuator inputs based on updated sensor feedback, thereby enabling real-time correction of orientation as needed.

With continued reference to FIG. 1, central controller may determine orientation commands to generate by referencing a predefined set of spatial and relational parameters provided in a digital blueprint. In one or more embodiments, central controller may perform a comparison between the real-time positional and orientational data received from dimensional verification sensors, and the target specifications defined in the digital blueprint. These specifications may include expected component-to-component angles, edge alignments, corner placements, spacing tolerances, and orientation vectors. In one or more embodiments, controller may use a set of predefined mapping rules or constraint conditions to identify the proper relational orientation between structural components. For example, the digital blueprint may specify that a wall panel must be perpendicular to a floor panel and aligned flush with its edge at a specified x/y/z coordinate. The controller may interpret these constraints and use them as a reference to assess whether the actual, sensor-derived orientation deviates from the target orientation. In one or more embodiments, central controller may apply geometric reasoning algorithms, inverse kinematics, or real-time optimization techniques to calculate the positional delta (i.e., the difference between actual and target position/orientation). Based on this delta, central controller may then generate movement instructions for the robotic arm assemblies to reorient the structural component accordingly. In one or more embodiments, central controller may use feature recognition or object matching techniques to detect known component types, such as beams, panels, or framing elements, and associate them with corresponding blueprint entries. This enables the automated assembly system to not only identify which component is currently being manipulated, but also to determine its intended final position relative to other components.

With continued reference to FIG. 1, In one or more embodiments, central controller may leverage the machine vision system to generate a relative coordinate system that maps the current positions and orientations of all structural components within the assembly environment. This relative coordinate system may act as a dynamic spatial reference model that enables the central controller to determine how each component is situated in relation to others at any given moment. In one or more embodiments, machine vision system may generate 2D images, 3D point clouds, or stereo disparity maps that represent the spatial geometry and positioning of each structural component. The data may then be processed using computer vision algorithms, such as edge detection, contour analysis, feature matching, and geometric segmentation, to extract positional information and assign coordinates to each component. Once captured, central controller may use visual data such as initial images to create a relative spatial model, wherein each structural component is assigned a coordinate (e.g., X, Y, Z) and an orientation (e.g., roll, pitch, yaw) in relation to a fixed reference point or base frame within the assembly cell. In one or more embodiments, digital blueprint may include a predefined coordinate system detailing where and how each structural component should be positioned and oriented. This blueprint may define absolute or relative spatial relationships, such as distances between component faces, alignment angles, and join locations. In one or more embodiments, central controller may compare the current relative coordinate system (as derived from the machine vision system) with the target configuration specified in the digital blueprint. This comparison may involve calculating deviations between the observed and intended positions and orientations of each component. For example, if a wall panel is identified as being offset 10 mm too far in the Y-direction or tilted by 2 degrees along the Z-axis, the controller will determine the necessary corrective movements. In one or more embodiments, corrections may be translated into orientation commands for the robotic arm assemblies, which are then actuated to reposition or rotate the components accordingly. The process may repeat iteratively and/or continuously, with updated image data (or subsequent images received) refining the coordinate system and feedback loop until all components conform to their intended spatial arrangement.

With continued reference to FIG. 1, In one or more embodiments, central controller may apply hierarchical assembly logic, wherein the orientation of each structural component is dependent on the successful placement of one or more prior components. For example, if a floor panel is already in position, central controller may calculate the required orientation of a wall panel based on the known geometry and position of the floor, using this reference as a frame of alignment for the new component. In one or more embodiments, machine learning models or rules-based systems may be used to refine or adjust the orientation logic based on prior builds, quality control feedback, or evolving component designs. In one or more embodiments, machine learning models, such as any machine learning models as described in this disclosure may be used dynamically refine or adjust the orientation logic used for positioning structural components. In one or more embodiments, machine learning models may learn from historical build data, real-time sensor feedback, quality inspection results and/or the like to improve the central controller's predictive accuracy and response to positional discrepancies. In one or more embodiments, the machine learning models may include supervised learning algorithms, such as regression models, decision trees, or neural networks, which are trained on labeled datasets containing examples of correctly and incorrectly assembled structural units. The features used in training may include sensor readings (e.g., positional deltas, spacing errors, angular deviations), actuator movements, final orientation results, and whether the assembled configuration passed post-assembly validation. Over time, the machine learning model may learn to predict optimal adjustments for component orientation based on similar input patterns. In one or more embodiments, reinforcement learning may be employed, wherein central controller operates within a feedback loop and receives a reward signal based on how well the actual orientation of components matches the specifications in the digital blueprint. For example, successful alignment within a predefined tolerance may yield a high reward, while excessive deviation results in penalties. The reinforcement learning agent can iteratively refine its policy to generate more efficient or accurate orientation commands for the robotic arms. Alternatively or additionally, unsupervised learning models, such as clustering or anomaly detection algorithms, can be used to identify novel patterns or recurring misalignment issues in component orientation data. These insights can be used to update orientation parameters or flag components or assembly conditions that deviate from typical patterns, prompting further optimization. With continued reference to FIG. 1, central controller may use a machine learning model such as orientation machine learning model to receive inputs such as positional data and outputs orientation commands. In one or more embodiments, orientation machine learning model may be configured to correlate positional data to orientation commands. In one or more embodiments, orientation commands may result in cracks, defects and/or improper alignment. In one or more embodiments, central controller may be configured to iteratively train orientation machine learning model through reinforcement learning by using feedback from an operator and/or feedback based on identified defects to train orientation machine learning model to generate more accurate and safe orientation commands. In one or more embodiments, machine vision system may be configured to iteratively monitor structural components for defects and/or cracks, wherein cracks or structural defects stemming from orientation commands may be used to train orientation machine learning model.

With continued reference to FIG. 1, orienting plurality of structural components may include adjusting a height of a first structural component of the plurality of structural components relative to a height of a second structural component of the plurality of structural components. In one or more embodiments, orientating may include adjusting for angular differences, adjusting for spatial differences and/or the like.

With continued reference to FIG. 1, machine vision system may be communicatively connected to, or include a quality control module. A "quality control module" as described in this disclosure is a software system or integrated hardware-software unit configured to analyze sensor and image data for detecting, classifying, and assessing defects or deviations in structural components during manufacturing. In one or more embodiments, a quality control module may operate on central controller and utilize algorithms, including machine learning and computer vision techniques, to ensure components meet predefined quality standards and specifications. In one or more embodiments, quality control module may be configured to identify structural defects in the plurality of structural components during an assembly or manufacturing process. In one or more embodiments, machine vision system may capture images of the structural components such as initial images and relay this data to quality control module for analysis. In one or more embodiments, quality control module may use one or more image processing and computer vision algorithms, such as edge detection, surface texture analysis, pattern recognition, and anomaly detection, to detect deviations from expected geometries or surface conditions. These deviations may include cracks, dents, warping, misalignments, incomplete joins, or other manufacturing defects that could compromise structural integrity. In one or more embodiments, quality control module may employ machine learning models, such as convolutional neural networks (CNNs) or other deep learning architectures, trained on labeled datasets containing examples of both defective and defect-free components. These models analyze the image and sensor data to classify defects, assess their severity, and localize their positions on the components. In one or more embodiments, quality control module machine include an image classifier such as any image classifier as described in this disclosure. In one or more embodiments, the image classifier may be configured to identify cracks, fractures and/or any other defects that would render a structural component unfit for use. In one or more embodiments, automated assembly system may use information from machine vision system and quality control module to make informed decisions about component placement. If a defect is detected in a particular structural component, controller may adjust orientation commands to compensate for minor deformities or may flag the component for removal or rework prior to final assembly. In one or more embodiments, central controller may further update the relative coordinate system of the components to exclude or mark defective areas, ensuring that subsequent orientation and joining operations avoid these regions or apply corrective measures. In one or more embodiments, automated assembly system may log defects as defect data in a centralized database for traceability, statistical process control, and continuous improvement of manufacturing processes. Alerts may be generated to notify operators or trigger automated interventions, such as activating auxiliary robotic arms to remove defective components or initiating additional inspection routines. In one or more embodiments, alerts may be transmitted to remote devices, such as laptops, smartphones, desktop computer and/or the like that notify an operator that an assembly process cannot continue until the structural component is replaced.

With continued reference to FIG. 1, quality control module and/or machine vision system may be configured to identify structural defects, such as cracks, fractures, missing components, and/or any other damage that may render a structural component unfit for use. In one or more embodiments, central controller may be configured to iteratively receive defect data detailing or identifying structural defects throughout an assembly process. In one or more embodiments, central controller may be configured to transmit commands based on identified defect data. In one or more embodiments, control controller may communicate with automated assembly system to cease an assembly process until structural component is replaced or removed.

With continued reference to FIG. 1, at step 115, method 100 includes securing each of the plurality of structural components using one or more precision locking mechanisms. "A precision locking mechanism" as described in this disclosure is a mechanical feature or system designed to align and secure two or more structural components. In one or more embodiments, precision locking mechanism may include a locking mechanisms configured to hold two components together with minimal tolerance for deviation. In one or more embodiments, automated assembly system may utilize precision locking mechanisms to facilitate in the securement of structural components using precision locking mechanisms. In one or more embodiments, a process of "securing" as described in this disclosure refers to the joining of two or more structural components. In one or more embodiments, securing may include rigidly attaching two or more components together. In one or more embodiments, components may be fixedly attached such that they are incapable of separation without damage. In one or more embodiments, precision locking mechanisms may include screws, adhesives and/or the like used to secure two or more structural components together. In one or more embodiments, precision locking mechanisms may be integrally formed or pre-installed on structural components themselves prior to affixing structural components to automated assembly system. This design approach may enable rapid and accurate joining of structural elements in a manner analogous to interlocking modular construction systems, such as those used in prefabricated housing, where wall panels, floor systems, roof trusses, and other framing elements are configured to engage with each other through built-in mating features. In one or more embodiments, each structural component may be manufactured with complementary geometries that enable automatic self-alignment and self-fixturing when brought into contact. For example, wall panels may include extruded or molded tongue-and-groove joints, dovetail connections, or snap-in latches that interlock with corresponding features on adjacent panels or floor plates. Similarly, roof trusses may feature notched end connectors, keyed sockets, or rotational locking tabs that allow them to interface with ridge beams, wall tops, or supporting columns without requiring custom on-site adjustment or fasteners. In one or more embodiments, such locking features may be embedded in the wooden, composite, or metal framing members themselves or affixed using secondary hardware such as brackets, dowels, or prefabricated corner joints. In one or more embodiments, automated assembly system may be configured to identify these locking features using machine vision system, which may recognize geometric cues or visual markers indicating the location, type, and orientation of the locking mechanism. Based on this data, central controller may determine the necessary approach path, insertion angle, and force profile required to engage the features effectively. Dimensional verification sensors may monitor the engagement process in real time to confirm proper fitment, alignment, and locking status.

With continued reference to FIG. 1, In one or more embodiments, each structural component may include alignment indicators or visual markers (as described above) that assist machine vision system in registering a position and intended connection point of precision locking mechanism. These visual indicators may be visual (e.g., printed QR codes or color-coded zones) or mechanical (e.g., keyed notches or asymmetric connector shapes). In one or more embodiments, digital blueprint may contain metadata associated with the locking features of each component, including location coordinates, engagement instructions, force tolerances, and expected feedback from dimensional verification sensors. This allows central controller to match the observed geometry of the physical component with its virtual representation, confirming that the correct part is present and that it has been properly oriented before executing the joining operation.

With continued reference to FIG. 1, in one or more embodiments, precision locking mechanisms may include but are not limited to: snap-fit joints, interlocking tab-and-slot systems, dowel-and-groove connections, keyed joints, and press-fit connectors. These mechanisms may be integrally formed within the structural components or installed as discrete elements at designated connection points. Precision locking mechanisms may be fabricated from metal, engineered plastic, composite materials, high-tolerance machined wood components and/or the like. In one or more embodiments, automated assembly system may be configured to manipulate structural components into alignment such that the respective precision locking mechanisms are engaged. For example, one robotic arm may hold a first structural component stationary while a second robotic arm, under the control of central controller, positions a mating structural component such that its locking features align and engage with the first. Engagement may occur through press-fit insertion, rotational twisting, vertical seating, or guided alignment aided by NAAMS-standard tooling fixtures integrated into the assembly station.

With continued reference to FIG. 1, in one or more embodiments, automated assembly system may use dimensional verification sensors to verify that the components are fully engaged, and the locking mechanism is properly seated. These sensors may detect micro-gaps, misalignment, or incomplete engagement and transmit this information to the central controller. If discrepancies are detected, the controller may generate real-time corrective commands (in the form of orientation commands) to adjust the robotic arms or re-orient the components, as necessary.

With continued reference to FIG. 1, in one or more embodiments, precision locking mechanisms may include detent-based fixtures, wherein spring-loaded balls or pins snap into recesses to provide tactile feedback and secure mechanical connection. Such mechanisms may be used in temporary fixturing or staging positions before permanent attachment operations are performed (e.g., welding, riveting, or adhesive bonding). In one or more embodiments, precision locking mechanisms may serve dual functions as both alignment tools and structural fasteners. For example, a mortise-and-tenon-style interlock may ensure squareness and perpendicularity between walls or frames while simultaneously bearing structural load. In such applications, automated assembly system may include force-controlled end effectors or torque-limited actuators that apply consistent pressure to ensure full engagement without damaging the materials.

With continued reference to FIG. 1, In one or more embodiments, a human technician may manually insert structural components into a jig or fixture integrated with precision locking features. Automated assembly system may then detect the pre-positioned components using machine vision system, verify their identity and orientation, and continue the assembly process using those fixed references. In one or more embodiments, precision locking may incorporate North American Automotive Metric Standards (NAAMS) fixtures. In one or more embodiments, NAAMS fixtures refer to tooling and workholding components designed in compliance with the North American Automotive Metric Standards (NAAMS). In one or more embodiments, NAAMS fixtures may be used to position structural components with repeatable, high-accuracy alignment. These fixtures may include built-in precision locking mechanisms that hold conventional 2×6 wood members or other framing elements in place during simultaneous framing and squaring operations. The locking features may also be pneumatically actuated or servo-driven to engage or disengage components as needed during automated or semi-automated workflows.

With continued reference to FIG. 1, in one or more embodiments, securement process may be done by automated assembly system as described above. In one or more embodiments, securement process may be done by a human operator and/or technician, wherein the human operator may manually place precision locking mechanisms to join one or more structural components. In one or more embodiments, automated assembly system may hold and secure structural components in place while human operator joins the components together using precision locking mechanism. In one or more embodiments, structural components may include precision locking mechanisms such as pre-installed, easily operable features such as quick-release latches, toggle clamps, cam locks, or twist-lock fittings, allowing for intuitive engagement without the need for tools. In one or more embodiments, a visual or indicator may be provided on the component to signify proper alignment before locking.

With continued reference to FIG. 1, in one or more embodiments, automated assembly system may aid and/or facilitate a securement process. In one or more embodiments, automated assembly system may include servo-actuated mechanical clamps, magnetically actuated latches, pneumatic/hydraulic engagement systems and/or the like that are configured to join structural components by locking structural components using embedded geometry such as dovetails, grooves, tabs, locking pins, snap-fit features, or custom joining profiles. Upon detecting proper alignment through dimensional verification sensors, the system may initiate a locking operation, thereby securing the components in the desired spatial configuration. In one or more embodiments, automated assembly system may be configured to identify the location and geometry of each precision locking mechanism using a machine vision system or dimensional verification sensor. Based on this data, the automated assembly system may orient each component accordingly and command one or more robotic arms to perform the joining operation with a high degree of accuracy, thereby ensuring squareness, plumbness, and load-path continuity in the resulting structural unit.

With continued reference to FIG. 1, at step 120, method 100 includes forming structural unit. In one or more embodiments, forming structural unit may include joining and/or securing all structural components together. In one or more embodiments, structural unit may include a plurality of structural components that have been joined or secured together. In one or more embodiments, following the alignment and engagement of structural components using precision locking mechanisms, automated assembly system may be configured to complete the formation of structural unit through a controlled joining sequence. Once two or more structural components are positioned in proximity and preliminarily engaged via complementary locking features, automated assembly system may apply a force sufficient to seat the components together in a final locked configuration. This seating process may involve linear pressing, rotational locking, or lateral displacement depending on the geometry of the locking interface. Dimensional verification sensors and machine vision systems may be used during and after the locking/securing sequence to validate component alignment, tolerances, and engagement depth, ensuring that the structural unit meets predefined assembly specifications. In one or more embodiments, automated assembly system may further actuate supplementary latching features, such as mechanical clamps, fasteners, or magnetic hold-downs, to reinforce the locked interface. Upon confirmation of all interlocks being fully engaged, automated assembly system may engage in post-assembly operations such as sealant application, surface treatment, or inspection logging.

With continued reference to FIG. 1, in one or more embodiments, automated assembly system may further include and/or be communicatively connected to a structural integrity verification subsystem. A "structural integrity sub verification system" is a system configured to verify the durability of structural unit. In one or more embodiments, structural integrity verification subsystem may be configured to detect cracks, voids, deformations, or other structural anomalies within the assembled structural unit. In one or more embodiments, structural integrity verification subsystems may utilize a combination of machine vision system, nondestructive evaluation (NDE) techniques, and/or sensor-based inspection tools to assess the mechanical soundness of joints and surfaces of structural unit. For example, high-resolution cameras paired with optical or infrared imaging modules may capture surface-level features of the structural unit to identify hairline fractures, delamination, or signs of incomplete engagement between precision locking mechanisms. In one or more embodiments, ultrasonic transducers, laser profilometers, or acoustic emission sensors may be integrated into the assembly environment to detect subsurface defects, measure material density variations, or monitor micro-vibrations indicative of latent faults. In one or more embodiments, machine vision system and/or central controller may execute trained defect detection algorithms using convolutional neural networks (CNNs) or other deep learning models to classify irregularities based on historical defect data and geometric baselines stored in memory. Detected issues may be localized with spatial mapping, enabling the system to flag specific structural components or joint regions for rework, reinforcement, or rejection. In one or more embodiments, automated assembly system may perform real-time structural diagnostics during or immediately following component joining, ensuring that crack propagation, material fatigue, or mechanical misalignment does not compromise the final integrity of the structural unit. In one or more embodiments, automated assembly system may generate, and log inspection reports correlated to digital blueprint identifiers, enabling traceability and long-term quality assurance across multiple manufactured units. In one or more embodiments, automated system may adjust joining pressure, reposition robotic arms, or execute corrective bonding procedures (e.g., applying adhesive, sealant, or fasteners) upon detecting compromised structural integrity.

With continued reference to FIG. 1, at step 125, method 100 includes removing the automated assembly system from the structural unit. In one or more embodiments, a process of removing automated assembly system may include undoing any process of affixing automated assembly system to one or more components as described in reference to at least step 105. In one or more embodiments, upon completion of the assembly and verification of the structural unit, automated assembly system may be configured to disengage from the structural components to allow for safe removal of the finished structural unit. The disengagement process may involve sequential or simultaneous release of one or more precision locking mechanisms, latching mechanisms, clamps, or other fixtures that temporarily secure the automated assembly system to the structural components. Actuators controlling these mechanisms may be instructed by the central controller to retract, unlock, or otherwise disengage, thereby freeing the structural components without causing misalignment or damage. In one or more embodiments, automated assembly system may employ sensors to verify that all mechanical connections between the robotic arms and the structural components have been fully released before initiating physical withdrawal motions. The robotic arms and other holding assemblies may then perform controlled retraction sequences, moving away along predetermined paths to avoid collision with the structural unit or surrounding equipment. During this process, positional sen sors and machine vision modules may continuously monitor the relative positions to ensure smooth and precise separation. In one or more embodiments, automated assembly system may include quick-release couplings or automated tool changers that facilitate rapid detachment of end-effectors or holding devices from the structural components. Additionally, manual intervention points may be provided for operators to safely complete or assist the disengagement process when required. Once fully disengaged, the structural unit may be transferred for further finishing, inspection, or transportation, while the automated assembly system is repositioned or reset to begin subsequent assembly cycles.

Figure 2:
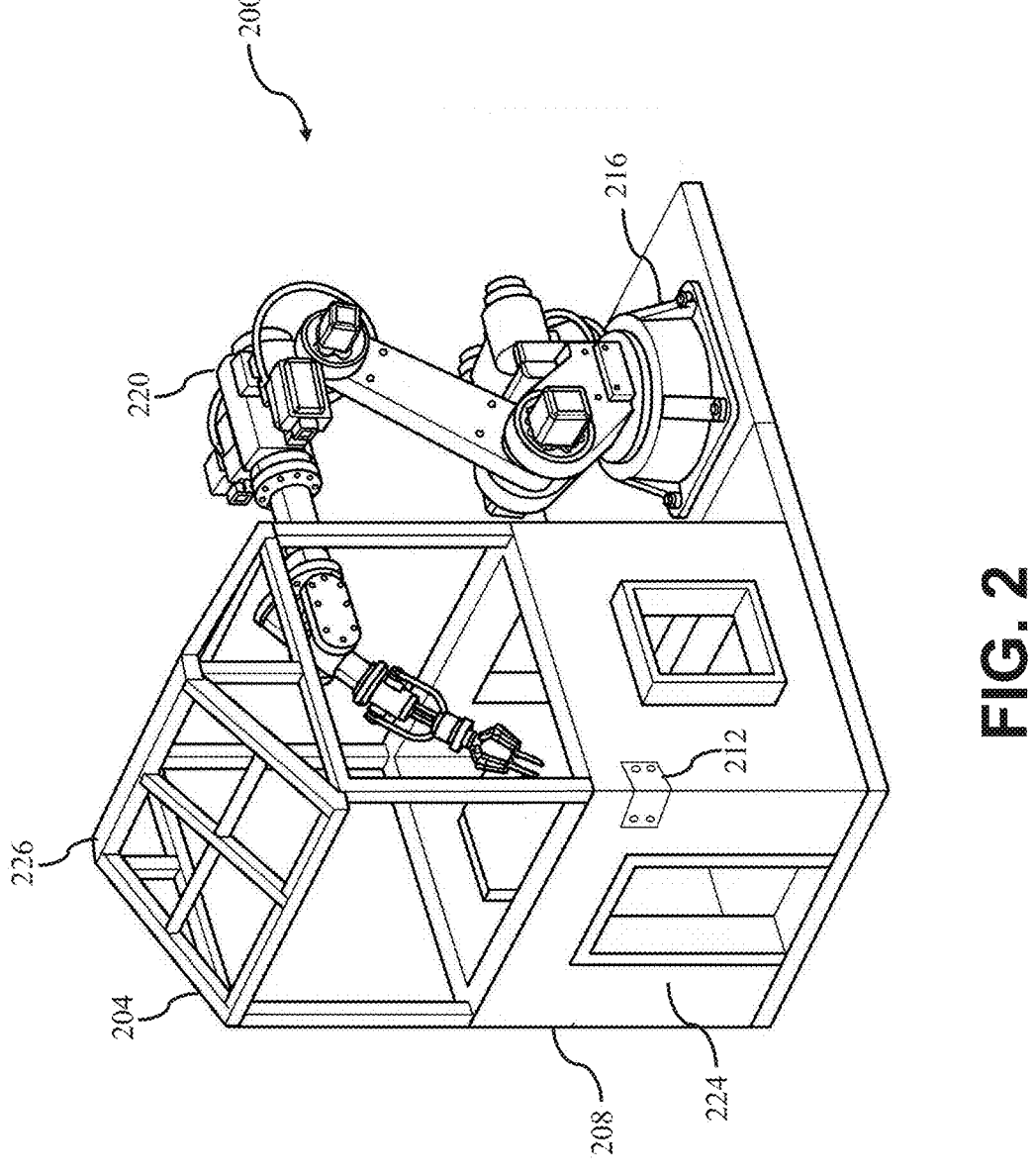
FIG. 2 is an exemplary illustration of a setup for manufacturing the structural unit.

Referring now to FIG. 2, an exemplary setup 200 for manufacturing of a structural unit 204 is described. In one or more embodiments, structural unit 204 may be formed and/or created using any steps and/or process as described in reference to at least FIG. 1. In one or more embodiments, structural unit 204 may include one or more structural components 208. In one or more embodiments, structural components 208 may include door frames, walls 224, windows, frames, Beams, a roof 226 and/or the like. In one or more embodiments, structural components 208 may include any components that will be incorporated into an overall structure of structural unit 204. In one or more embodiments, structural components 208 may be formed and/or joined using precision locking mechanisms 212. In one or more embodiments, precision locking mechanisms may include any securement mechanism described in this disclosure and/or any securement mechanisms known in the art that may be used to join two or more structural components. In one or more embodiments, precision locking mechanisms 212 may include nails, brackets, grooves and/or the like. In one or more embodiments, structural unit may be formed wholly and/or partially by automated assembly system 216. In one or more embodiments, automated assembly system 216 may include a robotic arm 220 configured to orient structural components. In one or more embodiments, structural unit 204 may be produced by affixing plurality of structural components 208 to automated assembly system 216, wherein the plurality of structural components include at least one roof and at least one wall. In one or more embodiments, structural unit may further be produced by orienting the plurality of structural components using automated assembly system, securing each of the plurality of structural components together using one or more precision locking mechanisms, forming a structural unit with the plurality of structural components and removing the automated assembly system from the structural unit. These steps may be implemented with reference to at least FIG. 1

Figure 3:
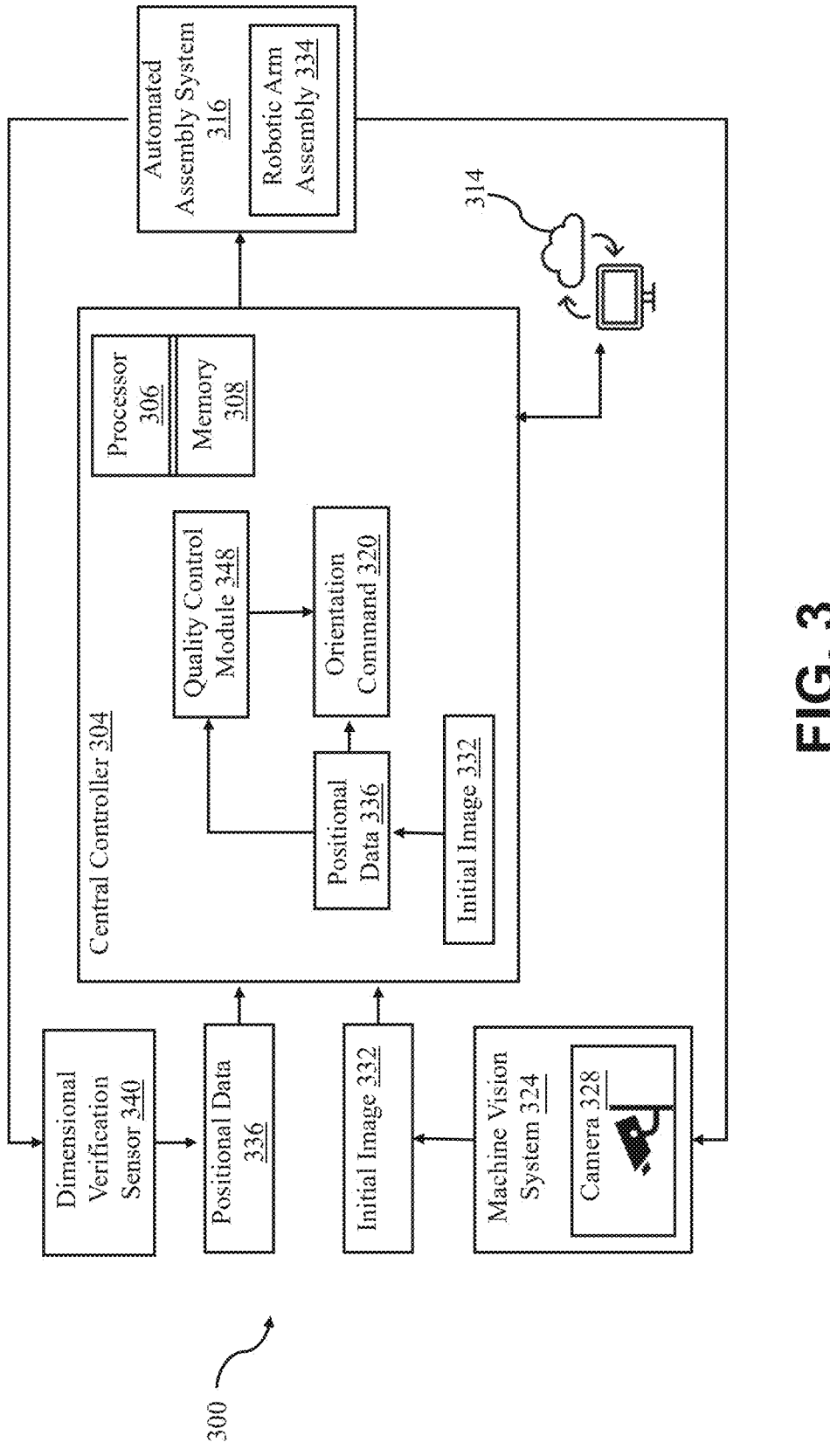
FIG. 3 is a block diagram of an exemplary system for generating orientation commands.

Referring now to FIG. 3, an exemplary system 300 for generation orientation commands is described. In one or more embodiments, system 300 may be consistent with any system as described in this disclosure. In one or more embodiments, system 300 includes a central controller 304. In one or more embodiments, central controller 304 may include a computing device. In one or more embodiments, central controller may include a processor 306 and a memory 308. In one or more embodiments, central controller may be communicatively connected to a database 314. In one or more embodiments, database 314 may include a cloud network, a server and/or the like. In one or more embodiments, central controller 304 may be configured to perform one or more actions, steps and/or processes in relation to automated assembly system 316 and the generation of orientation commands 320. In one or more embodiments, automated assembly system 316 may include and/or be communicatively connected to a machine vision system 324. In one or more embodiments, machine vision system 324 may include a camera 328. In one or more embodiments, machine vision system 324 and/or camera may be configured to capture images of structural components. In one or more embodiments, machine vision system 324 and/or camera may capture initial images 332. In one or more embodiments, initial images 332 may include images of an assembly environment. In one or more embodiments, initial images 332 may include images of structural components. In one or more embodiments, initial images 332 may be used to generate and/or identify positional data 336. In one or more embodiments, positional data 336 may include initial images 332. In one or more embodiments, automated assembly system 316 may include and/or be communicatively connected to one or more dimensional verification sensors 340. In one or more embodiments, dimensional verification sensors 340 may include any sensors as described in reference to at least FIG. 1. In one or more embodiments, dimensional verification sensors 340 may be used to receive and/or generate positional data 336. In one or more embodiments, positional data 336 may be used to generate orientation commands 320. In one or more embodiments, orientation commands 320 may include any orientation commands as described in this disclosure. In one or more embodiments, orientation commands may be used to manipulate one or more components of automated assembly system 316 such as a robotic arm assembly 334. In one or more embodiments, central controller 304 may include a quality control module 348 configured to receive positional data 336 and/or initial images 332 and generate orientation commands 320. This may be implemented with reference to at least FIGS. 1-2.

Figure 4:
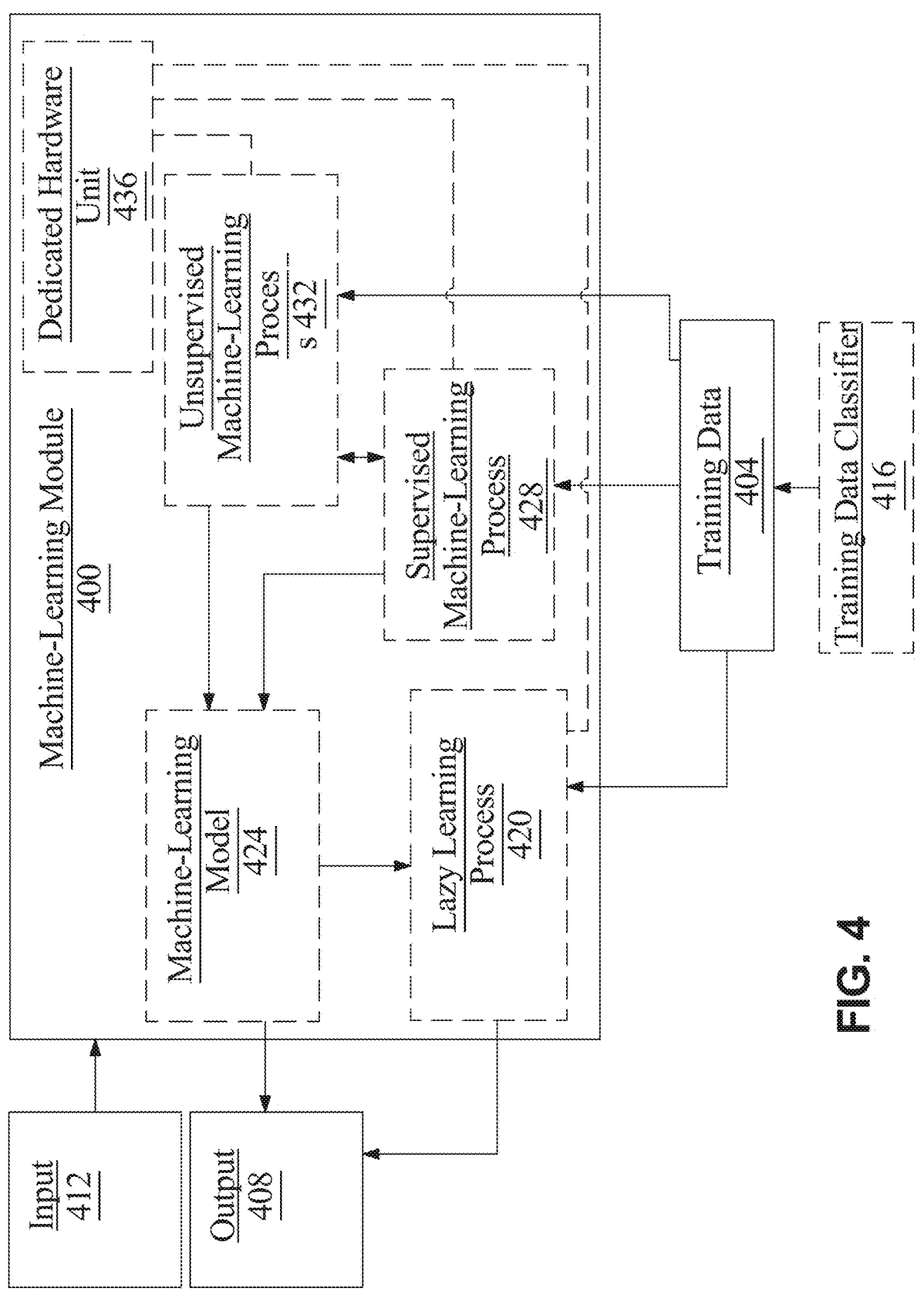
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include inputs such as positional data, initial images and/or the like and output may include outputs such as orientation commands.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to classes of structural components, such as floors, walls, roofs, beams and/or the like.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

here $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as initial images or position data as described above as inputs, orientation commands as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 4, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 4, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
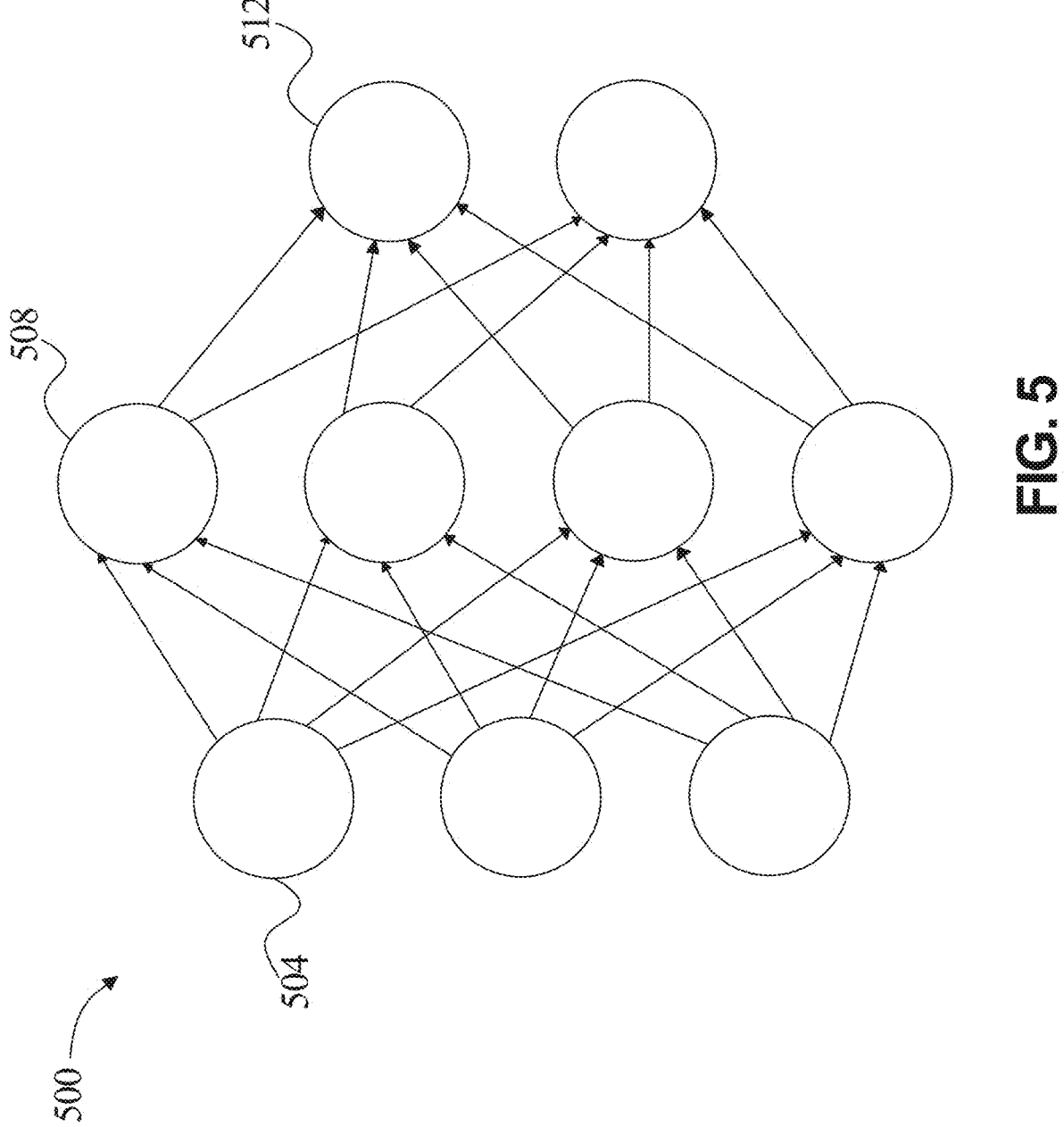
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
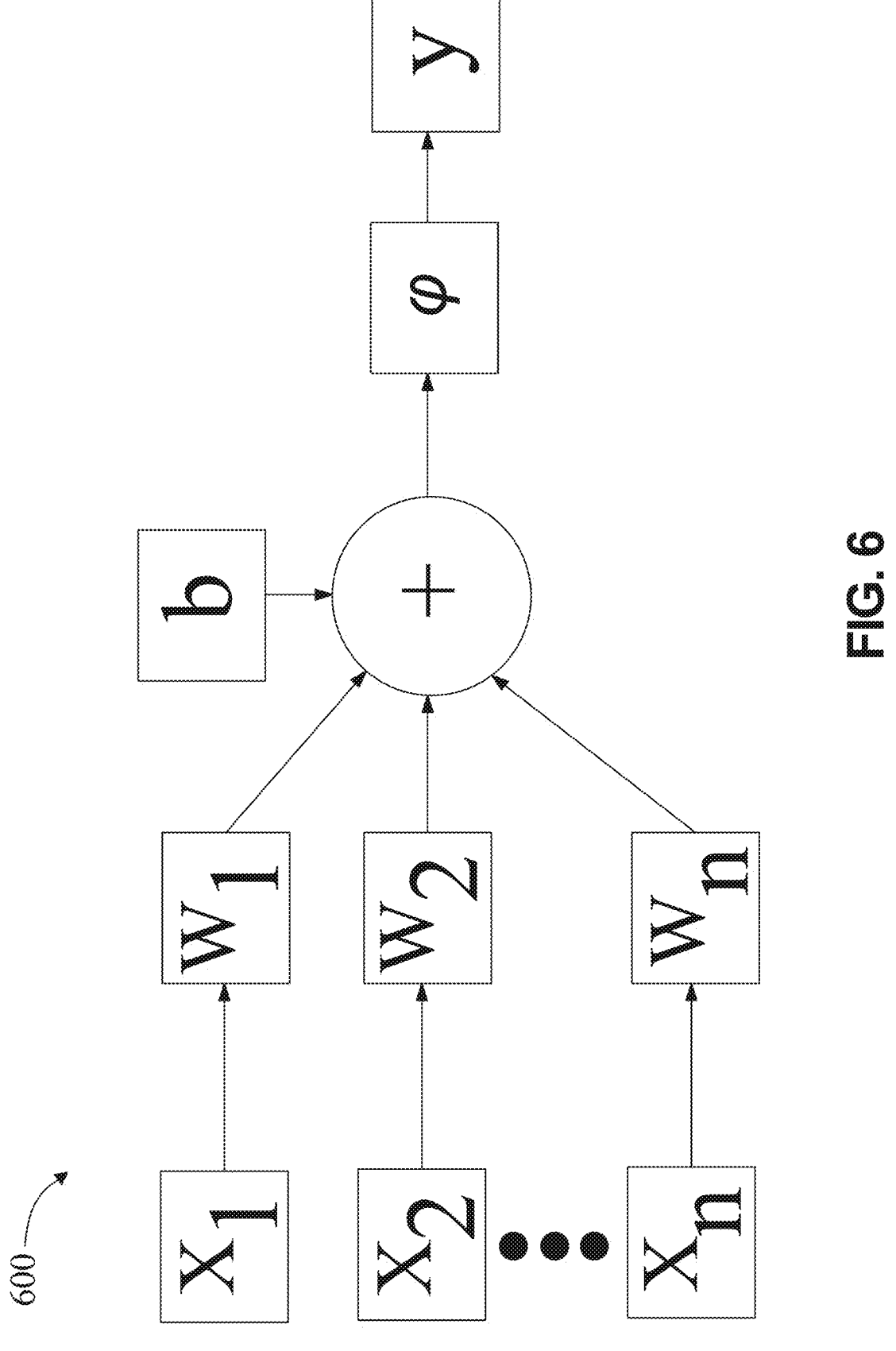
FIG. 6 is a block diagram of an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, $\alpha$ is a parameter to set the learning rate, and $$\frac{dJ}{dw}$$

is the partial derivative of with respect to weight w.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
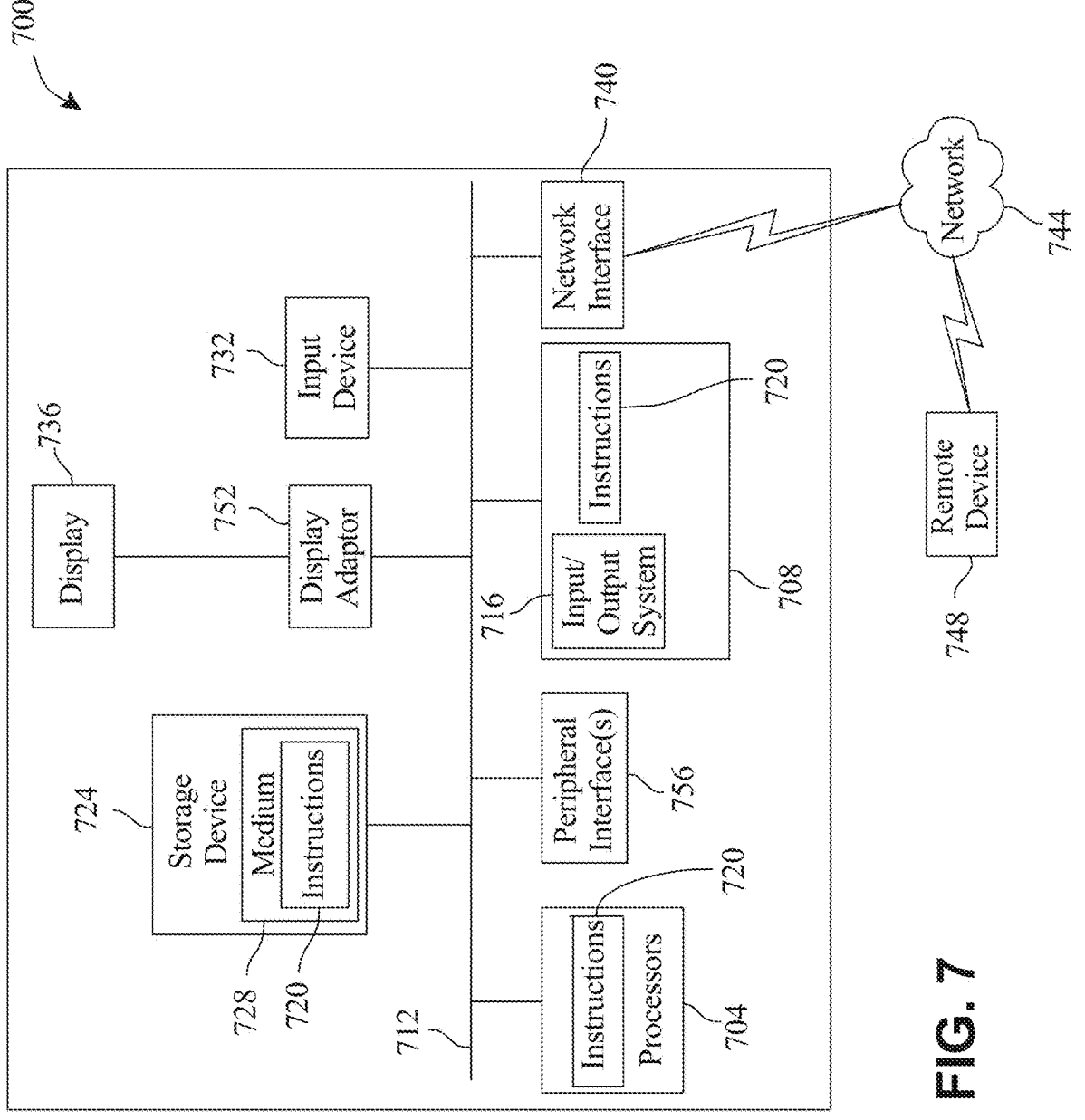
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 612 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for modular manufacturing of a structural unit, the method comprising:

affixing a plurality of structural components to an automated assembly system, wherein the plurality of structural components comprises at least one roof and at least one wall;

orienting the plurality of structural components using the automated assembly system, wherein orienting the plurality of structural components comprises:

identifying a defective component within the plurality of structural components using a machine vision system of the automated assembly system;

triggering an automatic intervention by activating an auxiliary robotic arm of the automated assembly system to remove the defective component; and replacing the defective component with another structural component using the automated assembly system;

securing each of the plurality of structural components together using one or more precision locking mechanisms;

forming a structural unit from the plurality of structural components; and removing the automated assembly system from the structural unit.

2. The method of claim 1, wherein the automated assembly system comprises one or more robotic arm assemblies.

3. The method of claim 1, wherein orienting the plurality of structural components using the automated assembly system comprises:

receiving, by the automated assembly system, a digital blueprint associated with the structural unit; and orienting, by the automated assembly system, the plurality of structural components as a function of the digital blueprint.

4. The method of claim 1, wherein orienting the plurality of structural components comprises adjusting a height of a first structural component of the plurality of structural components relative to a height of a second structural component of the plurality of structural components.

5. The method of claim 1, wherein the machine vision system is configured to identify the plurality of structural components.

6. The method of claim 5, wherein:

the machine vision system is communicatively connected to a quality control module; and orienting the plurality of structural components using the automated assembly system comprises identifying one or more structural defects within the plurality of structural components using the machine vision system and the quality control module.

7. The method of claim 1, wherein the one or more precision locking mechanisms comprise a NAAMS-standard tooling fixture.

8. The method of claim 1, wherein the automated assembly system comprises a plurality of dimensional verification sensors configured to monitor at least a spacing tolerance between one or more structural components of the plurality of structural components.

9. The method of claim 8, wherein orienting the plurality of structural components comprises:

continuously monitoring the one or more structural components using the plurality of dimensional verification sensors; and dynamically orienting the plurality of structural components as a function of the continuous monitoring.

10. The method of claim 9, wherein:

the automated assembly system further comprises:

a central controller comprising at least a processor; and at least one actuator communicatively connected to the central controller and coupled to at least one robotic arm assembly; and dynamically orienting the plurality of structural components comprises:

receiving, by a controller communicatively connected to the automated assembly system, positional data from the plurality of dimensional verification sensors;

generating, by the controller, one or more orientation commands as a function of the positional data; and manipulating, by the controller, the at least one robotic arm assembly by actuating the at least one actuator as a function of the one or more orientation commands.

* * * * *